US008578035B2

(12) United States Patent
Miklós et al.

(10) Patent No.: US 8,578,035 B2
(45) Date of Patent: Nov. 5, 2013

(54) TECHNIQUE FOR RELOCATING A SERVING GATEWAY ASSOCIATED TO A USER EQUIPMENT

(75) Inventors: Gyoergy Miklós, Pilisborosjenoe (HU); Attila Mihály, Dunakeszi (HU); Åke Arvidsson, Solna (SE); Johan Rune, Lidingoe (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 13/258,363

(22) PCT Filed: Aug. 12, 2011

(86) PCT No.: PCT/EP2011/004078
§ 371 (c)(1),
(2), (4) Date: Jan. 17, 2012

(87) PCT Pub. No.: WO2012/041420
PCT Pub. Date: Apr. 5, 2012

(65) Prior Publication Data
US 2012/0110197 A1 May 3, 2012

Related U.S. Application Data

(60) Provisional application No. 61/386,611, filed on Sep. 27, 2010.

(51) Int. Cl.
*G06F 15/16* (2006.01)
(52) U.S. Cl.
USPC ............ 709/228; 370/328; 370/329; 370/401

(58) Field of Classification Search
USPC .................... 709/228; 370/328, 329, 401
See application file for complete search history.

(56) References Cited

U.S. PATENT DOCUMENTS

| 2011/0075675 A1* | 3/2011 | Koodli et al. ................ 370/401 |
| 2012/0063300 A1* | 3/2012 | Sahin et al. .................. 370/225 |
| 2012/0230289 A1* | 9/2012 | Olsson et al. ................ 370/329 |

FOREIGN PATENT DOCUMENTS

| CN | 101 674 223 | 3/2010 |
| WO | WO 2009/152861 | 12/2009 |
| WO | WO 2010/102127 | 9/2010 |

OTHER PUBLICATIONS

International Search Report and Written Opinion mailed Dec. 15, 2011 in corresponding Application No. PCT/EP2011/004078.

(Continued)

*Primary Examiner* — Frantz Jean
(74) *Attorney, Agent, or Firm* — Nixon & Vanderhye P.C.

(57) ABSTRACT

A technique for relocating a Serving Gateway associated to a User Equipment is described. One method implementation of this technique is performed in a Mobility Management Entity, MME, and comprises the steps of a) triggering, from the MME, a relocation of a source SGW to a target SGW by sending a Create Session Request message to the target SGW, b) receiving, from the target SGW, a Create Session Response message including S1 General Packet Radio Service, GPRS, Tunnelling Protocol, GTP, endpoints of the target SGW, c) updating, from the MME to an Evolved NodeB, eNB, an Internet Protocol, IP, address and a Tunnel Endpoint IDentifier, TEID, of the target SGW, and d) sending, from the MME to the source SGW, a Delete Session Request to delete a session.

21 Claims, 21 Drawing Sheets

(56) References Cited

OTHER PUBLICATIONS

"3rd Generation Partnership Project; Technical Specification Group Services and System Aspects; General Packet Radio Service (GPRS) enhancements for Evolved Universal Terrestrial Radio Access Network (E-UTRAN) access (Release 9)", 3GPP Standard; 3GPP TS 23.401, V9.5.0, Jun. 10, 2010, pp. 1-259, XP050441571.

"$3^{rd}$ Generation Partnership Project; Technical Specification Group Services and System Aspects; General Packet Radio Service (GPRS); Service Description; Stage 2 (Release 9)", 3GPP Standard; 3GPP TS 23.060, $3^{rd}$ Generation Partnership Project (3GPP), No. V9.5.0, Jun. 10, 2010, pp. 1-298, X050441547.

Hitachi et al., "Load Re-balancing between GWs", 3GPP Draft; S2-100408_TD_Load_Rebalancing_GW, $3^{rd}$ Generation Partnership Project (3GPP), vol. SA WG2, No. Shenzhen; 20100118, Jan. 12, 2012; XP050432964.

Huawei: "Discussion on SGW selection", 3GPP Draft; C4-082242_DISC on SGW Selection, $3^{rd}$ Generation Partnership Project (3GPP), Aug. 8, 2008, XP050314138.

Huawei: "Connection management for SIPTO macro mobility", 3GPP TSG SA WG2 Meeting #80, No. TD S2-103492; Aug. 24, 2010, pp. 1-3, XP002665092.

"$3^{rd}$ Generation Partnership Project; Technical Specification Group Core Network and Terminals; 3GPP Evolved Packet System (EPS); Evolved General Packet Radio Service (GPRS) Tunnelling Protocol for Control Plane (GTPv2-C); Stage 3 (Release 9), 3GPP Standard; 3GPP TS 29.274, No. V9.3.0, Jun. 16, 2010, pp. 1-159, XP050441805.

"$3^{rd}$ Generation Partnership Project; Technical Specification Group Radio Access Network; Evolved Universal Terrestrial Radio Access Network (E-UTRAN); S1 Application Protocol (S1AP) (Release 9)", 3GPP Standard; 3GPP TS 36.413, No. V9.3.0, Jun. 14, 2010; pp. 1-241, XP050441721.

"$3^{rd}$ Generation Partnership Project; Technical Specification Group Core Network and Terminals; Domain Name System Procedures; Stage 3 (Release 9)", 3GPP TS 29.303, No. V9.2.0, Sep. 22, 2010, pp. 1-51, XP050442167.

"$3^{rd}$ Generation Partnership Project; Technical Specification Group Services and System Aspects; Local IP Access and Selected IP Traffic Offload (Release 10)", 3GPP Standard; 3GPP 23.829, No. V1.3.0, Sep. 22, 2010; pp. 1-44, XP050442123.

\* cited by examiner

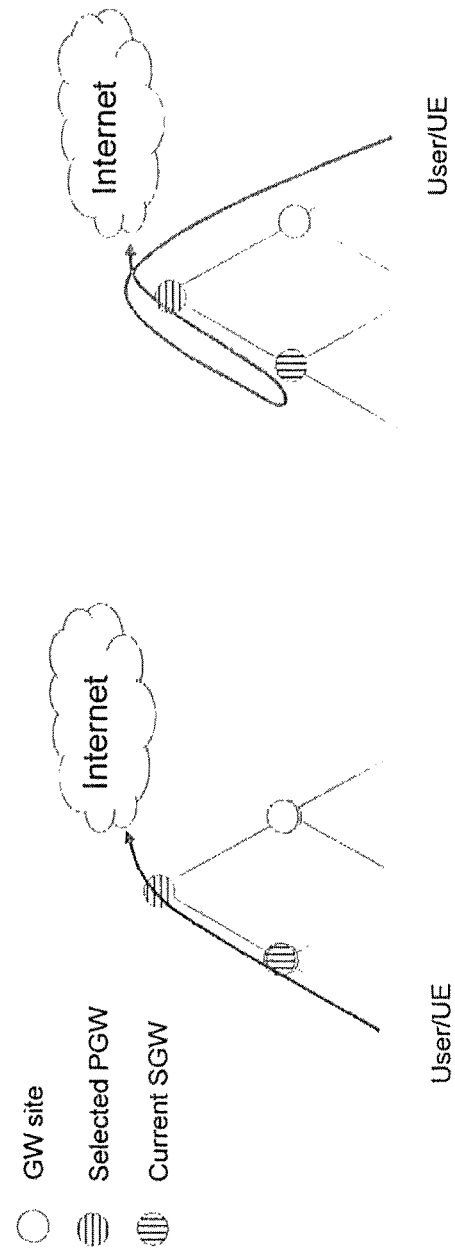

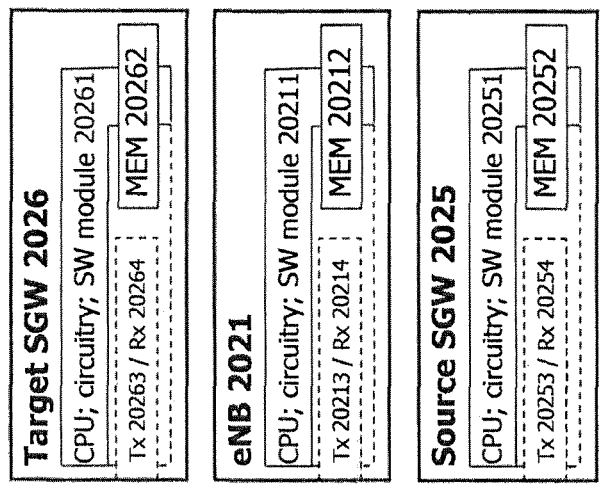
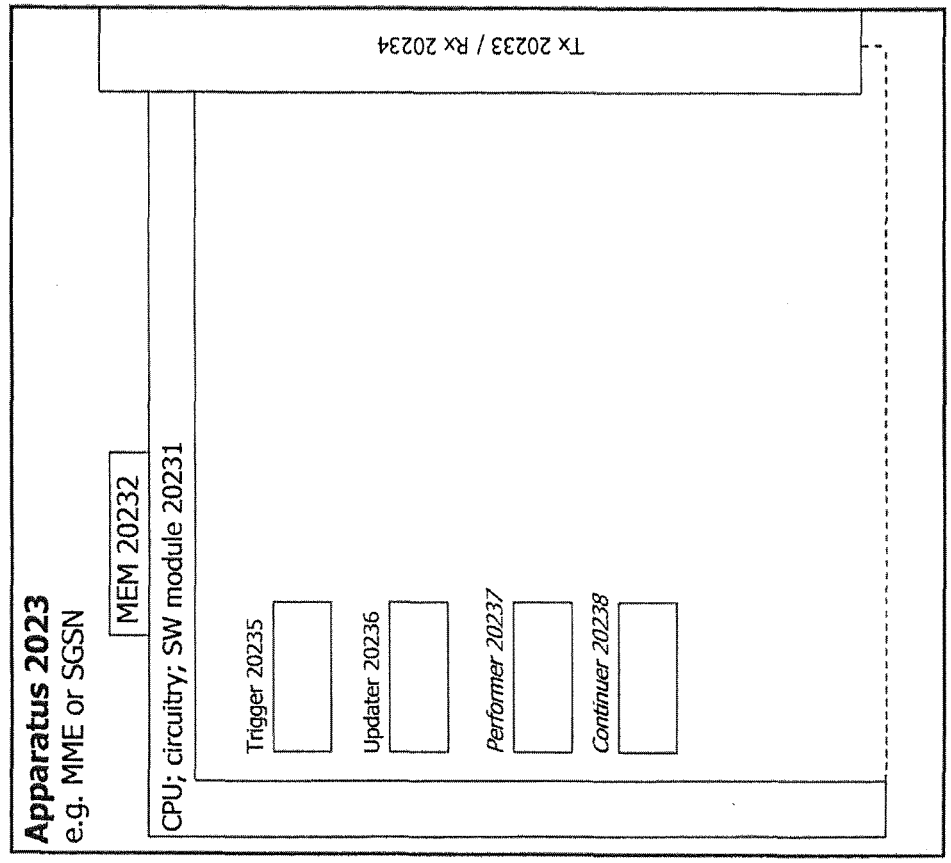
Fig. 6A

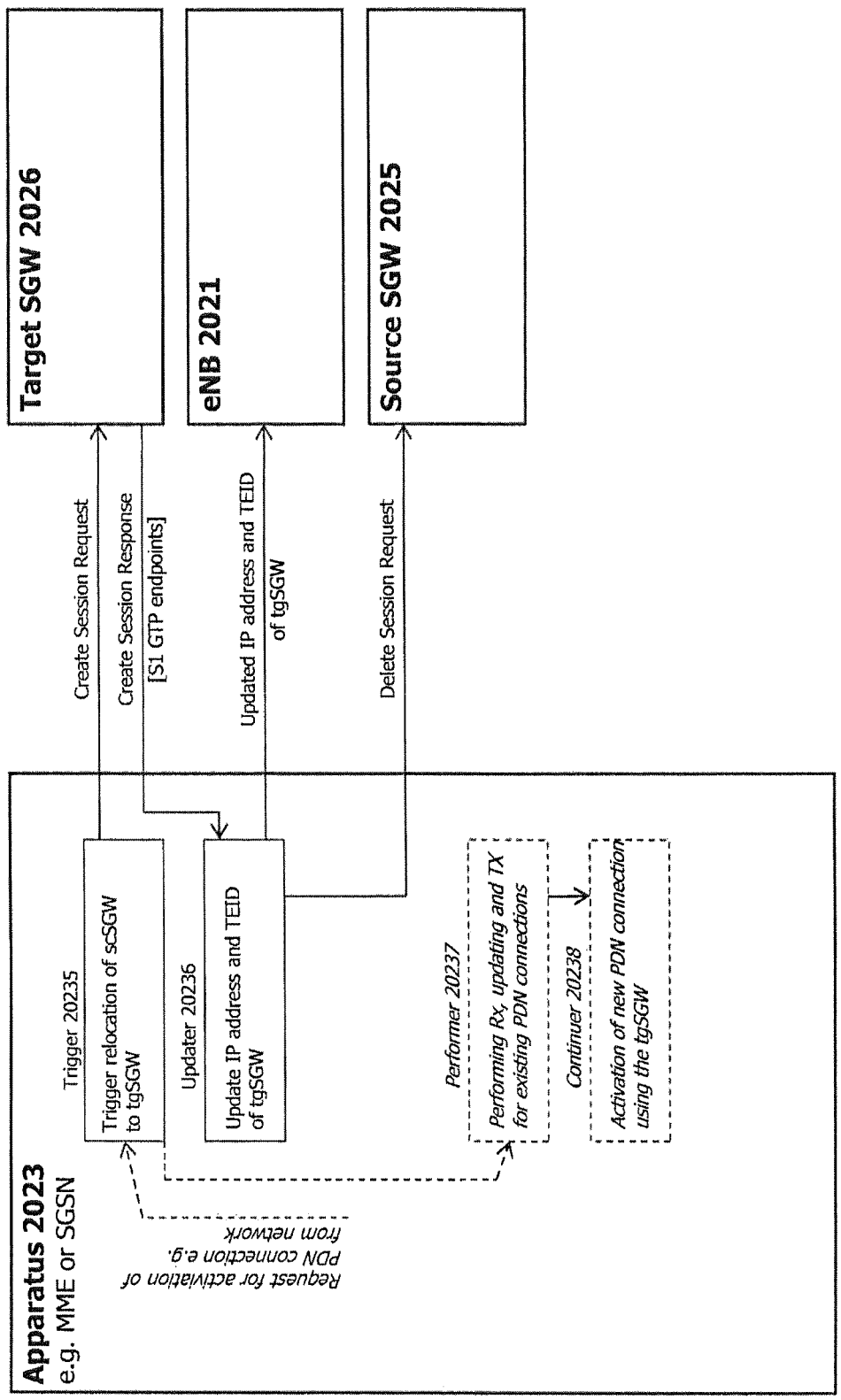

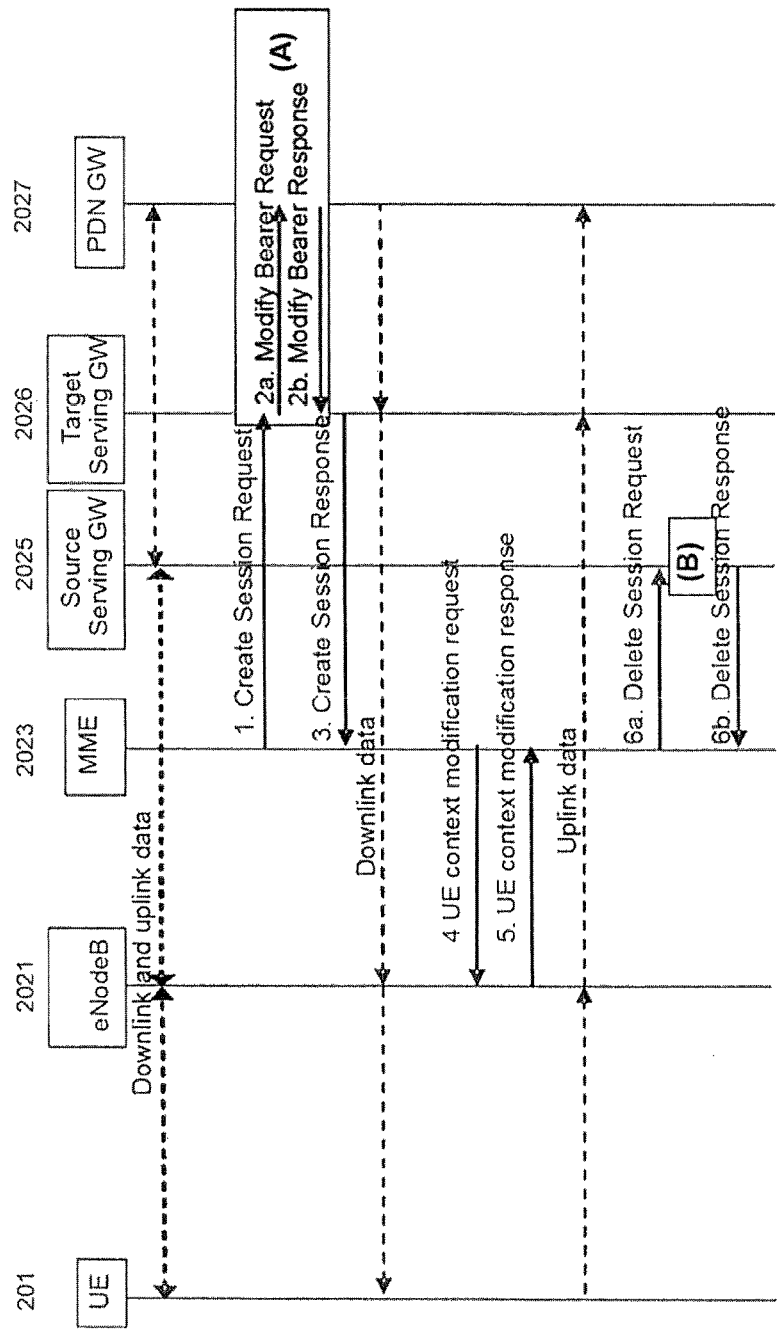

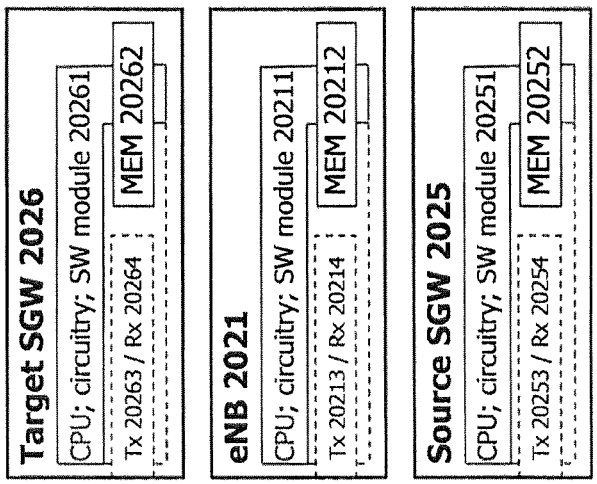
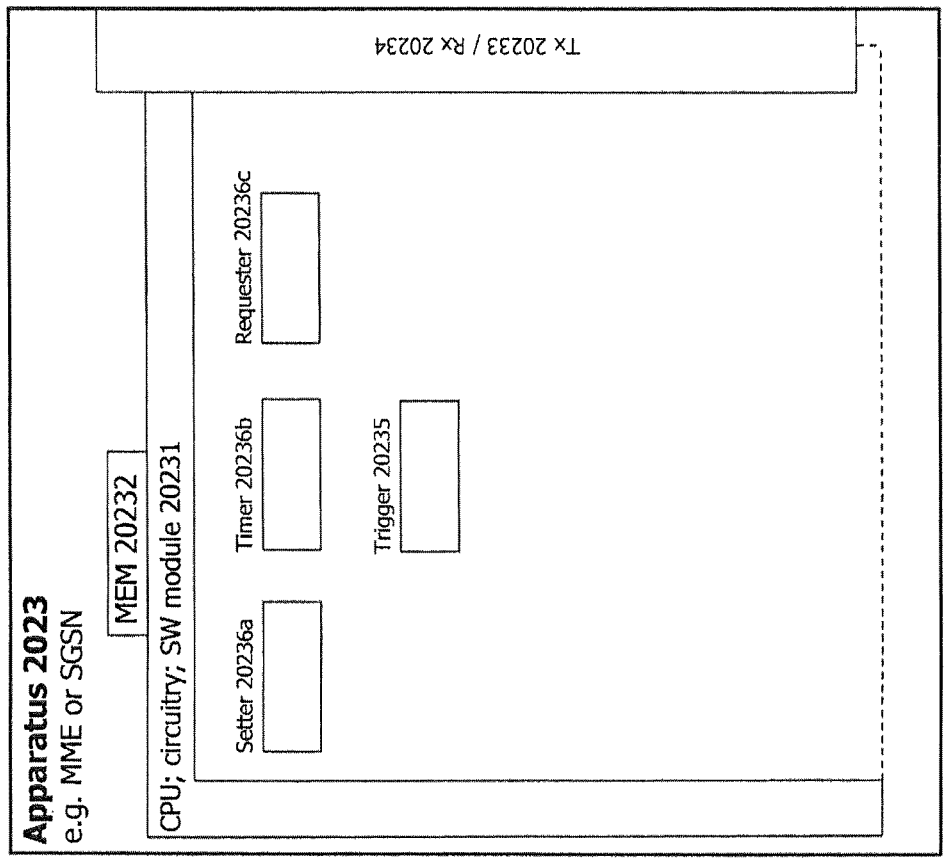
Fig. 7A

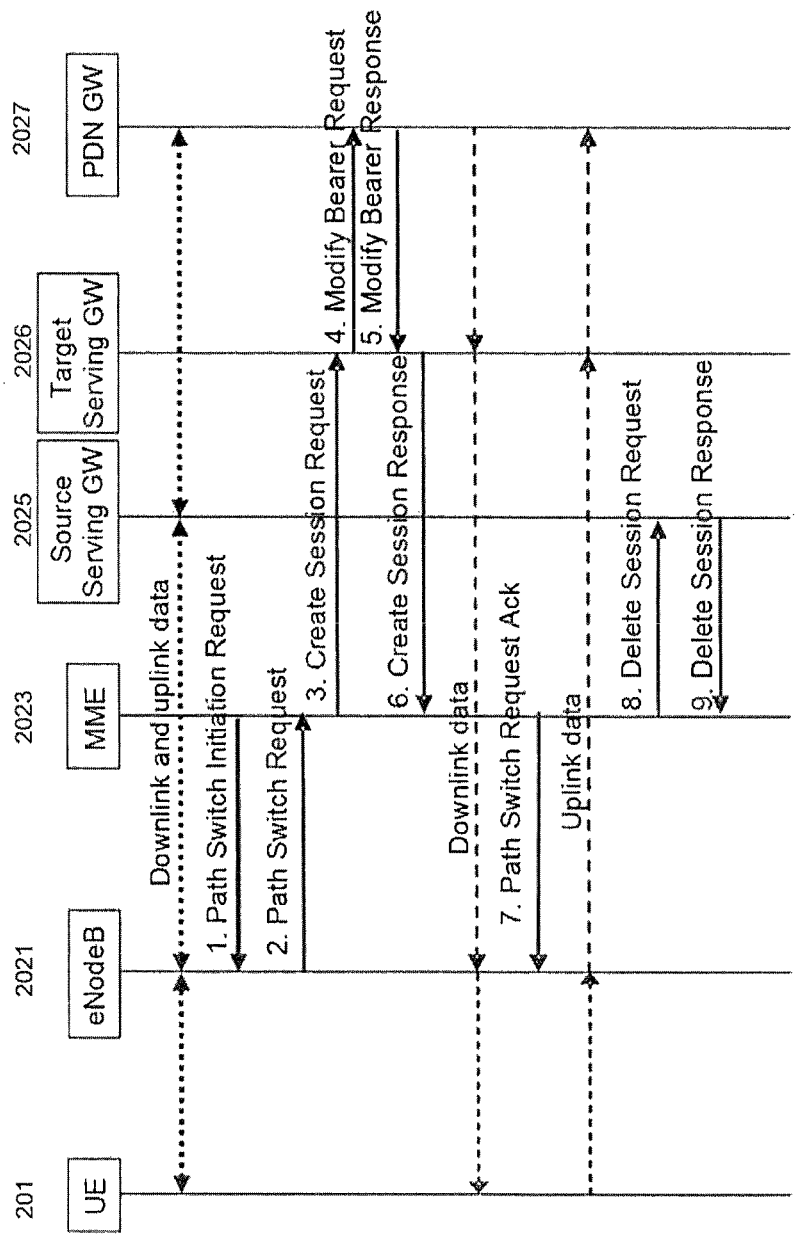

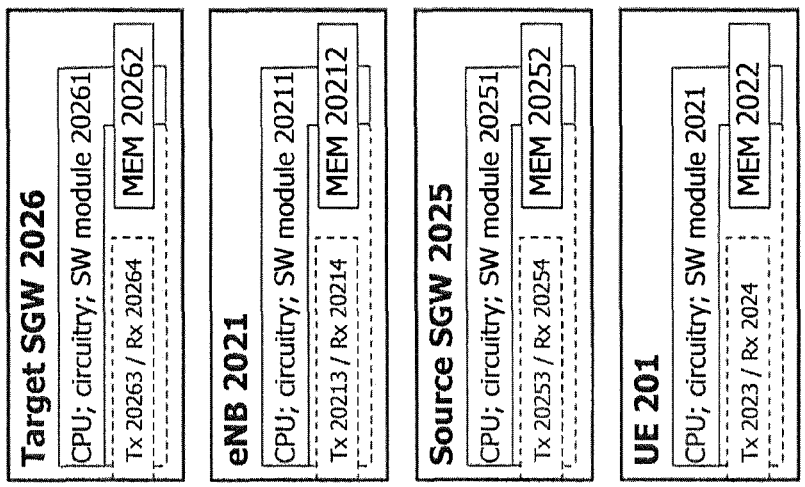
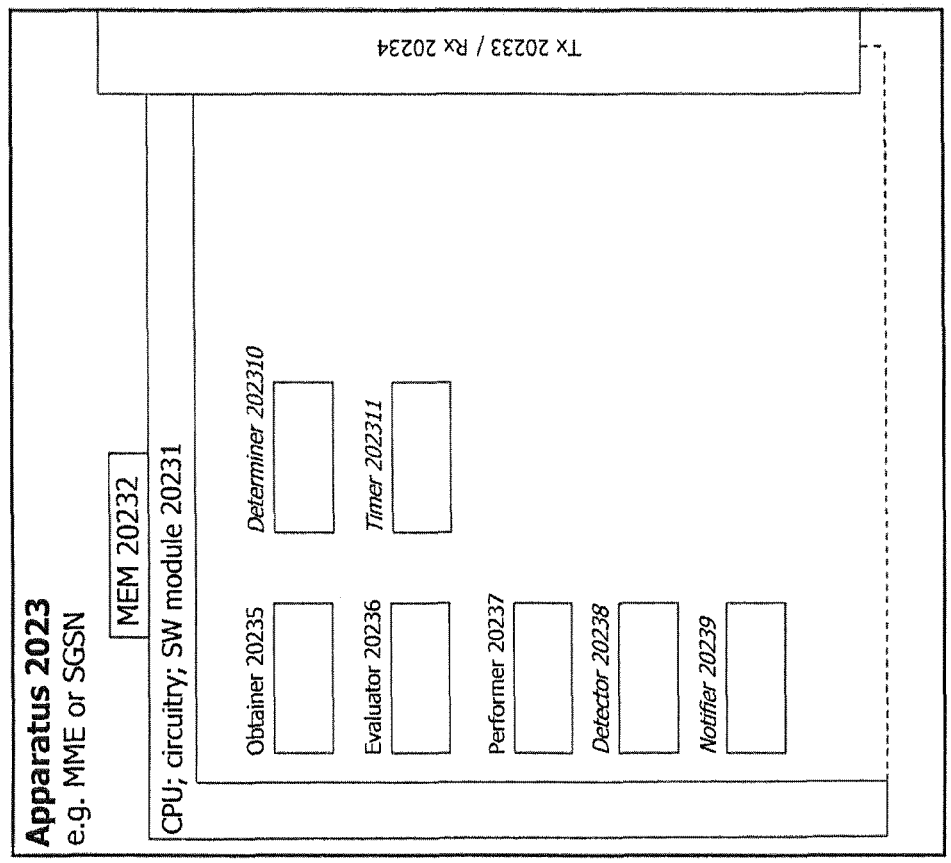
Fig. 8A

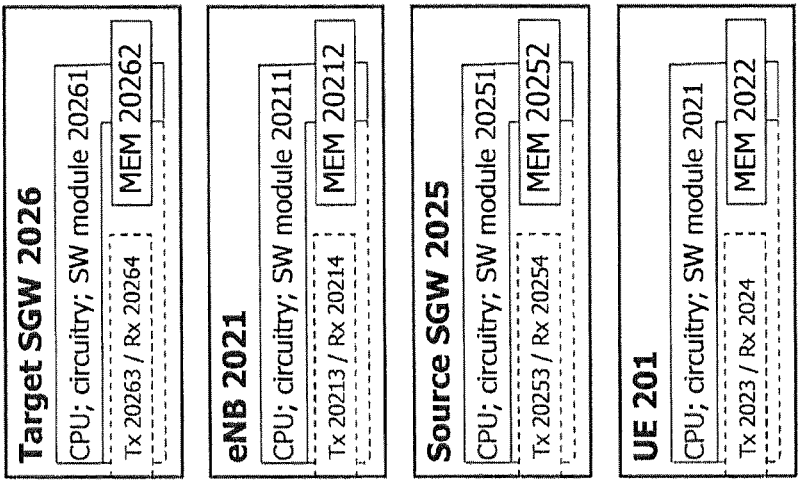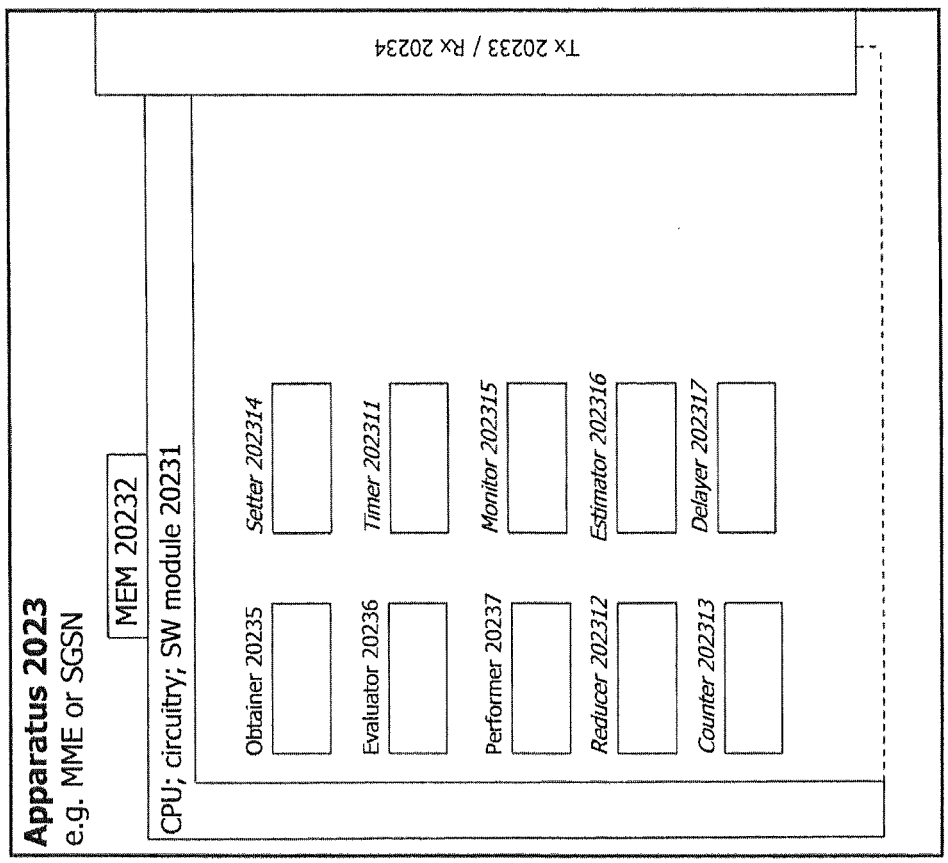
Fig. 8C

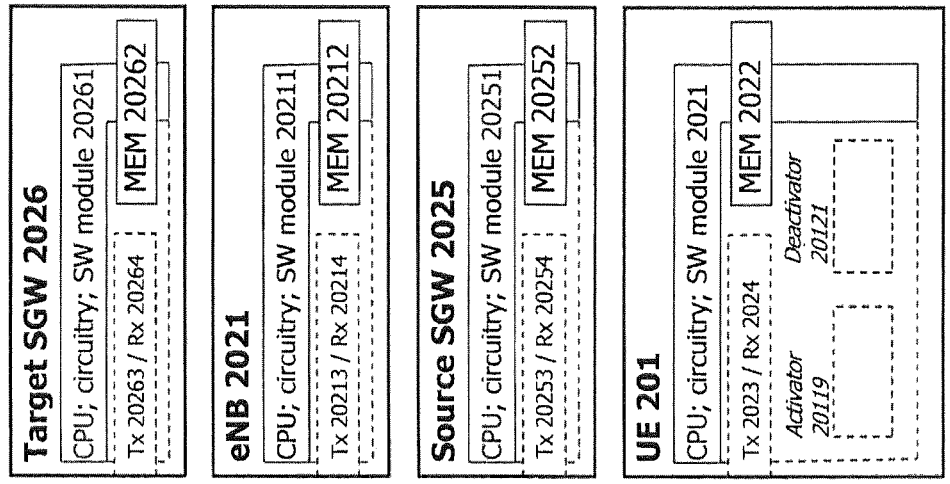
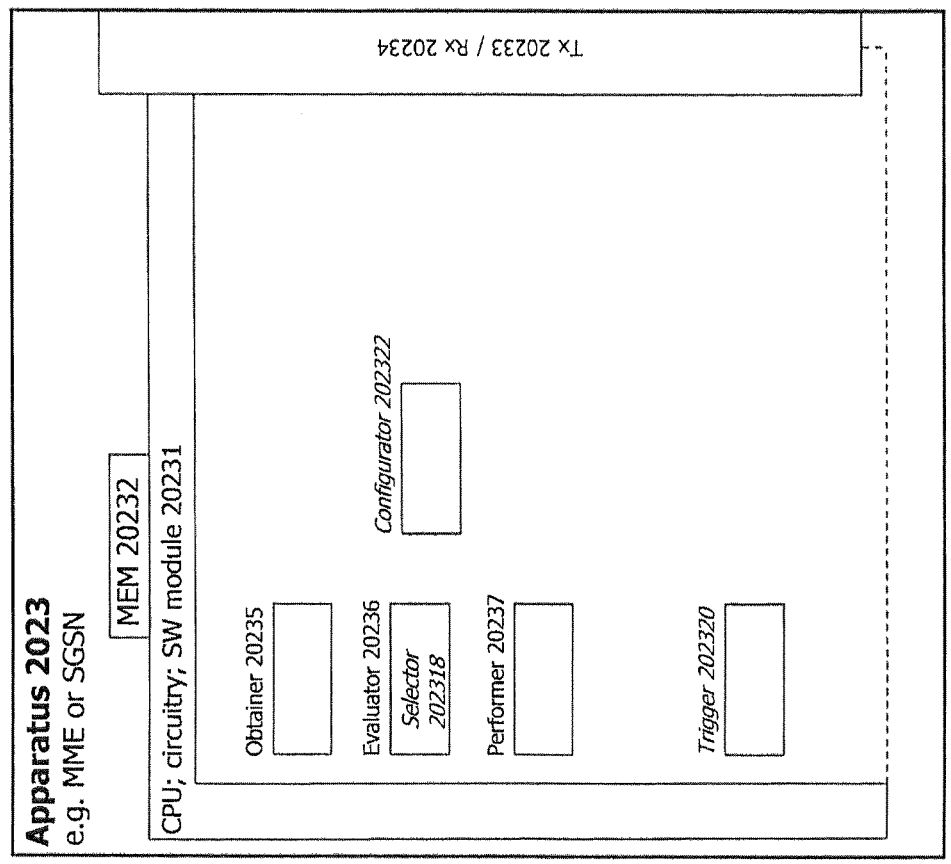
Fig. 8E

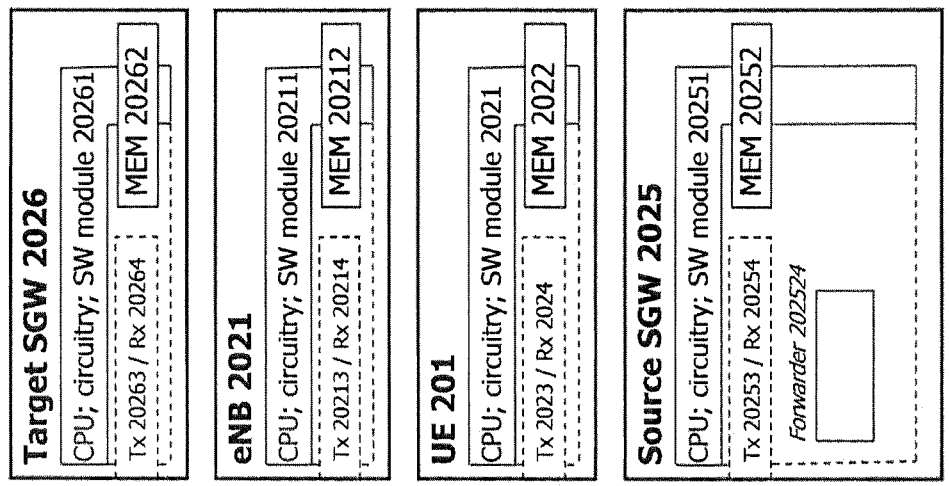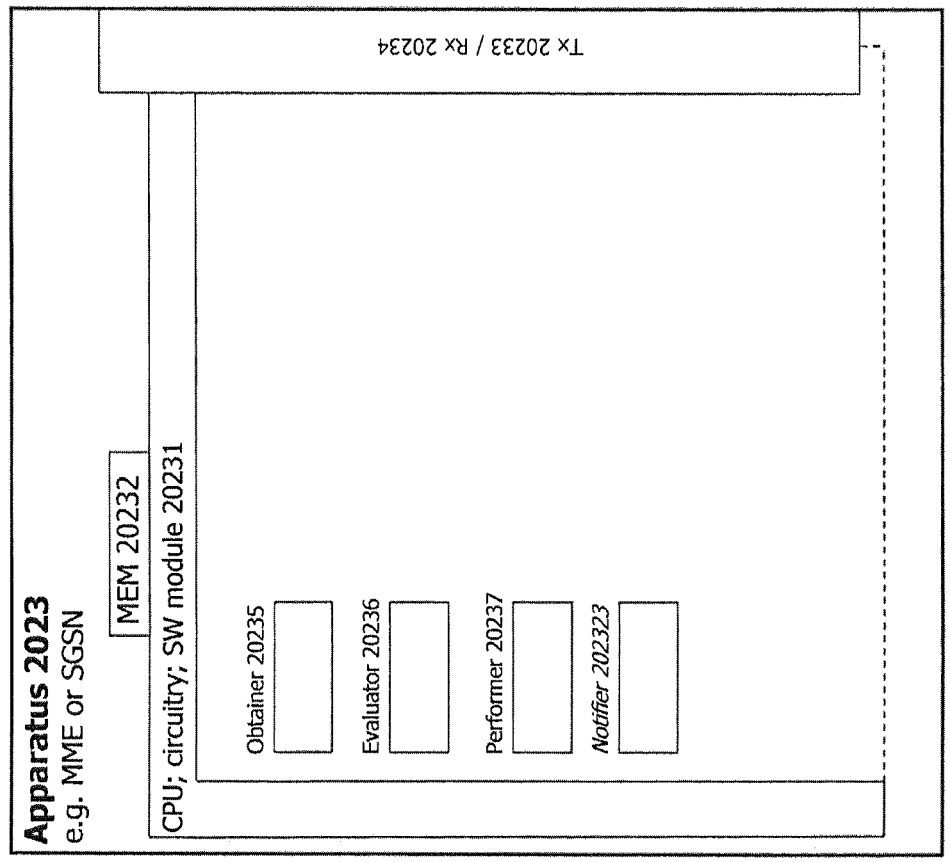
Fig. 9A

TECHNIQUE FOR RELOCATING A SERVING GATEWAY ASSOCIATED TO A USER EQUIPMENT

This application is the U.S. national phase of International Application No. PCT/EP2011/004078, filed 12 Aug. 2011, which designated the U.S. and claims the benefit of U.S. Provisional Application No. 61/386,611, filed 27 Sep. 2010, the entire contents of each of which are hereby incorporated by reference.

TECHNICAL FIELD

The present disclosure relates to a technique for relocating a Serving Gateway associated to a User Equipment.

BACKGROUND

The present invention may be related, for example, to the $3^{rd}$ Generation Partnership Project (3GPP) Evolved Packet System (EPS) and to the corresponding standard(s). In particular, the present invention may relate to the core network nodes Serving Gateway (SGW) and Mobility Management Entity (MME), or Serving General Packet Radio Service (GPRS) Support Node (SGSN) in the case of Universal Mobile Telecommunications System (UMTS) Terrestrial Radio Access Network (UTRAN) access or Global System for Mobile Communications (GSM) Enhanced Data Rates for GSM Evolution (EDGE) Radio Access Network (GERAN) access, as well as the User Equipment (UE).

FIG. 1 shows the above entities in a simplified view of the EPS network architecture. As shown in FIG. 1, a network 100 comprises a UE 101, an evolved nodeB (eNB) 1021, a Security Gateway (SEG) 1021a, an MME 1023, an SGSN 1023a, an SGW 1025, a Packet Data Network (PDN) Gateway (PGW) 1027, a Policy Charging and Rules Function (PCRF) 1025b, Internet Protocol (IP) services 1025c of a network operator, an Autonomous System (AS) border router (ASBR) or Peering point 1025d, a Home Subscriber Server (HSS) 1028, and the Internet 103. FIG. 1 further shows, by the dashes crossing the lines inter-connecting all entities, the interfaces used between the entities (for example, between SGW 1025 and PGW 1027, an S5 interface is used).

In the 3GPP EPS architecture, the traffic to and from the UE 101 is routed through the RAN, possibly through the SEG 1021a, the SGW 1025 and the PGW 1027, as shown by the thick line in FIG. 1.

The selection of the eNB 1021 is governed by radio conditions. The SEG selection is simply a consequence of the eNB selection, since the SEG has to be used, to which the eNB is connected to.

The SGW 1025 and the PGW 1027 are selected by the MME 1023 based on different criteria that may be classified into "hard" and "soft" criteria:

- A "hard" selection criterion is a criterion that must be fulfilled by the selected node. For instance, a selected PGW 1027 must support the Access Point Name (APN) that is associated with the concerned PDN connection and a selected SGW 1025 must serve the area (cell/eNB) where the UE 101 is located.
- A "soft" selection criterion is a criterion that may or may not be fulfilled. Soft criteria can often be fulfilled to a varying degree—the more the better. Examples that are applicable to selection of both the SGW 1025 and PGW 1027 include path optimization (e.g. topological closeness), possibilities of SGW 1025 and PGW 1027 in the same node (indicated in FIG. 1 by a thin dashed line surrounding the blocks of SGW 1025 and PGW 1027) and load balancing.

Selection of SGW 1025/PGW 1027 takes place in the network whenever a SGW 1025 and/or a PGW 1027 needs to be allocated to the UE 101, either to serve a new PDN connection (i.e. a new APN) or to replace a previously allocated SGW. There are three cases in which selection of the SGW 1025/PGW 1027 is triggered:

Attach (which includes establishment of an initial PDN connection and default bearer):
In this selection case, both SGW 1025 and PGW 1027 are selected.

SGW Relocation:
In this selection case, only the SGW 1025 is selected, while the PGW(s) remain(s) fixed.

Additional PDN Connection Establishment (for an additional APN):
In this selection case, only a PGW 1027 is selected, while the already allocated SGW 1025 remains.

The PGW 1027 acts as a mobility anchor and a point of presence for the UE 101. Thus, once a PGW 1027 is selected during attach of UE 101 or new PDN connection establishment towards an APN, the same PGW 1027 will be used irrespective of the UE 101 movements until the UE 101 is detached or the PDN connection is disconnected.

The SGW 1025 is selected for the default bearer at network Attach operation. A UE 101 can only have a single SGW 1025 allocated at a time, so the same SGW 1025 is used also for subsequent bearers, irrespective of the APN. In contrast to the PGW 1027, the SGW 1025 allocated to a UE 101 may change over the time: this is called SGW relocation.

A SGW 1025 may serve a limited part of the area of a Public Land Mobile Network (PLMN) (i.e. a limited fraction of the eNBs in the PLMN), denoted SGW Service Area (SA). SGW SAs are a collection of complete Tracking Areas (TAs). A Service Area is served by one or more SGWs 1025 in parallel. Service Areas may also overlap each other. Thus, an obvious reason of SGW relocation is UE mobility, i.e., SGW relocation is needed because the current SGW 1025 does not serve a new eNB 1021 to which the UE 101 has moved.

The standard (for example, 3GPP Technical Specification (TS) 23.401, V9.1.0) specifies two types of procedures that may involve SGW relocation:

One is the handover with SGW relocation; there are two possible procedures, the procedure for S1-based handover shown in FIG. 2 and the procedure for X2-based handover is shown in FIG. 3. Note that Long Term Evolution (LTE) specific procedures are shown, however, corresponding handover procedures exist for GERAN and UTRAN specified in TS 23.060 not shown here.

The other procedure is the Tracking Area Update (TAU) with SGW relocation, which is shown in FIG. 4. Note that this figure is also LTE-specific, however, for GERAN and UTRAN, the corresponding Routing Area Update (RAU) is defined in TS 23.060.

Accordingly, FIG. 2 depicting the S1-based handover with SGW relocation, shows a network having the UE 101, a source eNB 1021, a target eNB 1022, a source MME 1023, a target MME 1024, a source SGW 1025, a target SGW 1026, the PGW 1027 and the HSS 1028. FIG. 3 depicting the X2-based handover with SGW relocation, basically shows, with the exception of only one MME 1023 being present and the HSS 1028 being left out, the same entities as FIG. 2. FIG. 4 depicting the TAU with SGW relocation shows, with the extension that the source (or old) MME 1023 may also be an SGSN 1023 and the presence of PCRF 1029, the same entities as FIG. 2. Note that FIGS. 2 to 4 stem from the above-cited 3GPP TS 23.401, V9.1.0.

As a summary, current system procedures in the 3GPP Evolved Packet Core (specified, for example, in TS 23.401 and 23.060) allow for the relocation of the SGW 1025 during mobility events (such as handovers and tracking or routing area updates), but there is currently no possibility to relocate the SGW 1025 without using one of the mobility related procedures. This has been considered sufficient so far since it has not been expected that there are reasons but mobility to change SGWs 1025, 1026.

Another area of interest is enterprise networks which recently have gained increasing interest where multiple Home (evolved) nodeBs (H(e)NBs) may be deployed. In enterprise networks, a local GW node may also be deployed with the aim of providing Local IP Access (LIPA) towards the enterprise network. The following solutions have been proposed to address that scenario.

Serving GW Relocation Approach:
In that solution, the SGW 1025 is relocated into the local GW, so that the local GW takes on the roles of both the SGW 1025 and the PGW 1027 in the architecture (see, for example, 3GPP draft S2-102180). That allows for the reuse of the existing system architecture and procedures, while at the same time provides for local connections to the enterprise network without traversing the mobile operator network with user plane traffic.

Direct Tunnel with User Plane Only Interface:
Another alternative is to define a new direct tunnel solution where data is being sent directly between the H(e)NBs in the enterprise and the PGW 1027 in the enterprise. That can be realized either via updating the signalling interfaces S11, S4 and S5 in the operator's network (see, for example, 3GPP draft S2-102432).

Direct Tunnel with User and Control Plane Interface:
A variant of the previous solution is that a new signalling interface is also defined between the H(e)NB and PGW so that the impact on S11, S4 and S5 is avoided (see, for example, 3GPP draft S2-102433).

SUMMARY

Problems with Existing Solutions

Efficient Utilization of the Transport Network

The location of both SGW 1025 and PGW 1027 in the network topology in relation to the UE 101 is essential for the traffic path and thus for the transport resource usage and transport cost incurred by the traffic to and from the UE 101. Even though a transport-wise suitable SGW 1025 and PGW 1027 may be selected for a UE 101 when it attaches to the network, the suitability of the SGW 1025 may soon change as the UE moves around in the area covered by the network or it changes its activity patterns by opening new bearers or PDN connections.

Suboptimal traffic paths due to subscriber movements may result from the fact that as long as the UE 101 keeps the same PDN connection to the network, which may range from minutes to weeks (disregarding the extremes), the UE 101 also remains connected to the same PGW(s) 1025 that were originally selected. The selected SGW also remains the same unless the subscriber moves away from the service area of the given SGW.

FIG. 5 shows an illustration of suboptimal traffic paths resulting from subscriber movements. The left-hand portion of the figure shows a traffic path resulting from an optimal GW selection at attach, while the right-hand figure shows a traffic path resulting when the subscriber moves to another region. FIG. 5 underlies the assumption that both SGWs 1025, 1026 are in the same service area.

The problem with longer paths due to mobility shown in FIG. 5 may be avoided by selecting nodes higher up in the topology hierarchy than both SGW 1025 and PGW 1027 at attach (assuming that this GW is combined SGW/PGW node and its service area covers the whole tree shown in FIG. 5). However, such a selection might not always be possible due to node constraints (such as the lack of combined SGW 1025 and PGW 1027 or lack of sufficient SGW capacity) or other optimizations.

Another possibility is to define smaller service areas such that subscriber movements will trigger SGW relocation, according to the procedure in FIG. 3. The problem with small SGW service areas is, on one hand, SGW 1025 usage efficiency, i.e., it precludes load sharing among a higher number of SGWs 1025 and, on the other hand, that SGW 1025 relocation likely results in a separation of the functionality of SGW 1025 and PGW 1027, which is a suboptimal setup from GW resource perspective.

A second case for suboptimal paths is that of a moving subscriber that has multiple PDN connections on different PGWs. If the UE 101 is moving away from one of these PGWs and approaching one of the other PGWs which is also a combined node but the serving SGW is currently another node (e.g. in the node also housing the PGW 1027 the UE 101 is moving away from), then SGW is clearly becoming suboptimal.

A third potential cause for suboptimal routes is changes in PDN connectivity. For example, when the UE 101 adds a new PDN connection for which the PGW 1027 combined with the current SGW 1025 cannot be selected and the new PGW 1027 is a combined node, and the new PGW 1027 is more important in some sense, e.g. due to higher traffic volume, or delay sensitive traffic generated towards the new PGW etc., then the current SGW is not optimal anymore. However, SGW relocation is not triggered by this event. Similarly, after the release of an existing PDN connection e.g., to a PGW 1027 that is combined with the selected SGW 1025 for the given UE 101, the current SGW 1025 may not be optimal for the remaining PGWs (in terms of transport optimization and/or in terms of SGW-PGW combination).

A special example of suboptimal placement of the SGW 1025 with a new PDN connection is pointed out in 3GPP draft S2-103492 in combination with the Selected IP Traffic Offload (SIPTO) feature, i.e. when the GW is selected close to the user's point of attachment. In that example, the UE 101 moves to a new location in idle mode executing the TAU (or RAU for UTRAN/GERAN) procedure, but the new MME 1024 has to decide about SGW relocation before the SIPTO indication is received from HSS 1028. That may lead to the MME 1023 selecting a central SGW which will be suboptimal in case SIPTO is applied later on with a local GW. The solution proposed in 3GPP draft S2-103492 resides in repeating the SIPTO subscription information in the user context, but that is not a desirable solution as it implies that the same information is sent twice in different signalling messages which may lead to inconsistencies and extra complexity.

Suboptimal selections of SGWs, from the perspective of a combined node, may also happen in the single-PDN connection case with overlapping SGW service areas. One example is when at the time of attachment the position of the UE 101 is outside the SAs of the SGWs combined with all potential PGWs (e.g. the PGWs that support the requested APN), but later the UE 101 moves into a region that is included in the SA of the SGW combined with the selected PGW. If, however, the SA of the originally selected SGW spans also over this region, this movement will not trigger a SGW relocation, so the UE will continue to be attached to the less optimal SGW.

Yet another reason for suboptimal routes is changes in traffic conditions. Subscribers may generate different traffic patterns to different PGWs at different times of day (on different days of week, etc.). Alternatively, new Guaranteed Bite Rate (GBR) bearers may be set up or released thus changing the importance of certain PGWs, but neither of these events trigger SGW relocations and thus the path to the most important PGW 1027 may become suboptimal.

The conclusion of the above is that it would be beneficial to have a mechanism that allows the network to change the SGW 1025 that a UE 101 is associated with in order to adapt the SGW location (and the transport network path) to the (changing) location of the UE 101, PDN connectivity or traffic pattern.

Efficiency of SGW Relocation Based Enterprise Local Access Solution

For the specific case of local IP access in an enterprise network, the procedures proposed below aim at improving the first approach of SGW relocation as opposed to the direct tunnel based approaches as described above in conjunction with FIG. 1. While that solution can be realized based on existing system procedures only, it has a performance issue: it currently requires more SGW relocation events than actually necessary for the solution to work, and this additional signalling causes extra system signalling load as well as extra traffic load on the local GW. The reason for the extra SGW relocation events is that it is not possible to relocate the SGW 1025 when a local connection is actually established, which causes network to relocate the SGW 1025 to the local GW each time there is a possibility for the establishment of a local connection independently of whether or not such a local connection will actually be established or not.

Specifically, the following events may occur, each of which causes unnecessary SGW relocation events or unnecessary usage of the local SGW:
- A UE 101 which has non-local connections only and moves into the enterprise network would require a SGW relocation into the enterprise network as long as the user is eligible for a local connection no matter whether it will eventually be used or not.
- A UE 101 which establishes a non-local connection (or attaches to the network) within the enterprise would need to be assigned a local SGW as long as the user is eligible for a local connection no matter whether it will eventually be used or not.
- A UE 101 which has only a local connection and moves out of the enterprise while keeping the connectivity via a local SGW would require a SGW relocation to an operator SGW no matter whether the user will eventually establish a non-local connection or not.

Besides the extra signalling events and unnecessary local SGW load, the current behaviour also has the drawback that the SGW relocation trigger must be made per UE subscription or configuration, so that UEs 101 that are eligible for a local connection in a given enterprise network need to be treated specially with respect to SGW relocation, which causes extra complexity in the MME/SGSN nodes that are responsible for triggering SGW relocation.

There are problems with the alternative approaches for an enterprise local connectivity as follows.

Regarding the approach of a direct tunnel with a user plane-only interface that would require an SGW 1025, 1026 upgrade that may be hard to justify: it may take a very long time until an operator upgrades all its SGW nodes 1025, 1026 for this solution. Until that happens, a transitional phase would need to use SGW relocation from a non-upgraded SGW to an upgraded SGW—but then it is hard to justify the solution as it would be simpler to relocate the SGW into the enterprise network. Besides the migration issue, the solution requires all connected mode mobility, session management and idle-connected procedures to be updated, which is significant system impact which requires standardization, implementation, testing and integration efforts that are costly. In the long term, the solution introduces a new type of mobility mode, resulting in an increase of mobility options which leads to divergence in deployment, with the risk of market fragmentation and interoperability problems.

Regarding the approach of a direct tunnel with user and control plane interface, that would also require the mobility procedures to be upgraded which is considerable impact. It is unclear how this solution fits into systems with a mixture of H(e)NBs and eNBs 1021, where only some of them support the feature which can cause problems e.g. when a handover happens to an (e)NB 1021, 1022. This would also open up a new architecture track and increase system complexity in the long term, which is unnecessary as the existing architecture can already perform "direct tunneling" between HeNB 1021 and SGW 1025. Also note that the proposal not only impacts the HeNB 1021 but also requires a new type of local standalone PGW 1025 node type, so existing operator PGW nodes could not be re-used for this purpose.

A new procedure is introduced for SGW relocation which is triggered by the MME/SGSN 1023 independent of mobility events. The new procedure can perform SGW relocation both in connected and idle mode, and avoids packet losses. Examples are given for trigger conditions that may be used to start the procedure.

With the help of the new procedure, it is possible to optimize the transport network utilization, and optimize the load of the GW nodes. For the case of enterprise local IP access, it is not necessary to make an a priori SGW relocation (or local SGW selection) for all the cases where it may be potentially needed. It is possible to restrict SGW relocation to the cases when it is actually necessary.

In a first aspect, there is provided a method for relocating a Serving Gateway, SGW, with which a user equipment, UE, is associated, the method being performed in a Mobility Management Entity, MME, and comprising the steps of a) triggering, from the MME, a relocation of a source SGW to a target SGW by sending a Create Session Request message to the target SGW, b) receiving, from the target SGW, a Create Session Response message including S1 General Packet Radio Service, GPRS, Tunneling Protocol, GTP, endpoints of the target SGW, c) updating, from the MME to an Evolved NodeB, eNB, an Internet Protocol, IP, address and a Tunnel Endpoint IDentifier, TEID, of the target SGW, and d) sending, from the MME to the source SGW, a Delete Session Request to delete a session. This allows for an SGW relocation procedure without mobility trigger.

According to the first aspect, steps a) to d) may be performed while the UE is connected to the eNB remaining unchanged. Alternatively, the UE may be Evolved Packet System, EPS, Mobility Management, EMM-registered with the MME. As another alternative, the step c) may be performed by using a UE context modification request and response. As a still further alternative, step c) may be performed for all Packet Data Network, PDN, connections. In the latter case, step a) may be performed responsive to a request for activation of a new PDN connection, and the method may further comprise e) performing, at the MME, the SGW relocation procedure of steps b) to d) for the existing PDN connections, and f) continuing, at the MME, the activation of the new PDN connection using the target SGW.

Further, step c) may be skipped if the UE is in the idle mode. In addition or alternatively, the method may be performed in a third generation, 3G, network with direct tunneling, wherein a Serving General Packet Radio Service, GPRS, Support Node, SGSN, may assume the role of the MME, a Radio Network Controller, RNC, may assume the role of the eNB, and step c) may be performed using a pair of Radio Access Bearer, RAB, assignment request and response messages.

Alternatively to the 3G direct tunneling approach, the method may be performed in one of a second generation, 2G, and a 3G network without direct tunneling, wherein an SGSN may assume the role of the MME, a Radio Network Controller, RNC, may assume the role of the eNB, and step c) may be skipped.

In a second aspect, there is provided a method for relocating an SGW with which a selected UE is associated, the method being performed in an MME, and comprising the steps of a1) setting, in the MME, a flag for the UE selected for SGW relocation, in preparation for the next time the UE performs a mobility procedure, or a2) waiting, in the MME, until the selected UE transits to an idle mode, or a3) requesting, from the MME, an eNB to initiate a path switch, b) triggering, from the MME responsive to step a1), a2) or a3), a relocation of a source SGW to a target SGW (2026) by sending a Create Session Request message to the target SGW, c) receiving, from the target SGW, a Create Session Response message including S1 GTP endpoints of the target SGW, and d) sending, from the MME to the source SGW, a Delete Session Request to delete a session. This allows for an alternative to the above first aspect that does not involve more complexity than the first aspect.

In a third aspect, there is provided a method for relocating an SGW with which a selected UE is associated, the method being performed in an MME, and comprising the steps of a) getting information so as to trigger an evaluation procedure for SGW relocation, b) evaluating whether the SGW relocation would be beneficial for the UE, and c) performing, if the relocation is beneficial, the SGW relocation for the UE by sending a Create Session Request message to a target SGW, receiving, from the target SGW, a Create Session Response message including S1 GTP endpoints of the target SGW, and sending, from the MME to a source SGW, a Delete Session Request to delete a session. This allows for a SGW relocation in terms of transport optimization.

According to the second or third aspects, the UE may be Evolved Packet System, EPS, Mobility Management, EMM-registered with the MME.

According to the third aspect, step c) may only be performed if the UE is in the idle mode. Further, relocating step c) may be performed if evaluating step b) results in a target SGW different from the source SGW. In the latter case, the relocating step c) may only be performed if the target SGW is evaluated to be more beneficial than the source SGW by a predetermined margin.

In a first example of the third aspect, step a) may comprise detecting, by the MME, that one of the network traffic volume and traffic composition has changed significantly. In that case, a significant change in traffic composition may be constituted by a change in traffic destination. Alternatively, a significant change in traffic composition may be constituted by at least one of opening and closing Guaranteed-Bit Rate, GBR, bearers. In the latter case, a Quality of Service, QoS, Class Indicator, QCI, may be used to indicate a traffic type of the GBR bearers.

Further to the first example of the third aspect, the change in traffic volume may be detected by long-term traffic statistics of the UE. In that case, the long-term traffic statistics may involve traffic patterns of the UE to different PGWs on different times of day or different days of the week. As an alternative to the long-term statistics, the change in traffic volume may be detected by short-term traffic statistics of the UE. In the latter case, the short-term traffic statistics may involve sudden or unexpected changes in UE behaviour.

In a second example of the third aspect, step a) may comprise receiving, at the MME, a notification that the UE performs one of opening a new PDN connection and closing an existing PDN connection.

In a third example of the third aspect, step a) may comprise detecting, by the MME, that the UE has moved to a new location upon the UE transiting from an idle mode to a connected mode.

In a fourth example of the third aspect, the method may further comprise determining, by the MME, the target SGW by using a Selected IP Traffic Offload, SIPTO, function, and step c) may be performed so as not to disturb on-going traffic flows. Alternatively, in case of step c) being performed in the UE idle mode, the method may further comprise waiting, by the MME, until the UE enters the idle mode, and determining, by the MME, the target SGW by using a SIPTO function.

In a fifth example of the third aspect, the method may further comprise determining, by the MME, that the source SGW is too heavily loaded, and initiating the SGW relocation based on the determination. In that case, a too heavy load may be determined by receiving, at the MME, overload indications from the source SGW. Alternatively, a too heavy load may be determined by receiving, at the MME, request rejections from the source SGW.

In a sixth example of the third aspect, the method may further comprise determining, by the MME, that a failure has occurred in the source SGW. In that case, the occurrence of the failure is notified to the MME by an Operations and Maintenance, O&M, system. Alternatively, the occurrence of the failure is determined by receiving, at the MME, request rejections from the source SGW.

In a seventh example of the third aspect, the method may further comprise determining, by the MME, that the source SGW is about to be taken down for at least one of service and maintenance due to scheduled O&M actions.

In the above first, third, fourth or fifth example, the method may further comprise detecting, at the MME, a load situation of all potential SGWs by getting load information of the potential SGWs. In that case, the load situation may be described using the capacity limit of each SGW and the current load of each SGW.

In an eighth example of the third aspect, the method may further comprise reducing, prior to the triggering, a number of triggers. As a first alternative, the reducing may performed by limiting a time window during which UE movements trigger an SGW evaluation. In the latter case, the limited time window may a window of 5 minutes every hour. As a second alternative, the method may further comprise counting a number N of location events by the UE, and performing steps b) and c) only every $N^{th}$ event. As a third alternative, the method may further comprise, after performing steps b) and c), waiting a predetermined period of time during which subsequent performance of steps b) and c) is prohibited. In the latter case, the method may further comprise setting a flag so as to indicate whether at least one change has occurred during the predetermined period of time, if the flag is set, performing steps b) and c) at the end of the predetermined period of time, and waiting again for the predetermined period of time.

According to the eighth example, the method may further comprise maintaining a list of one of already evaluated locations and already evaluated conditions, monitoring whether the one of already evaluated locations and already evaluated conditions re-occurs during a second predetermined period of time, and, if re-occurrence is detected during the second predetermined period of time, not performing steps b) and c).

As an alternative to the list approach in the eight example, the method may further comprise estimating a current processing load of the MME upon receipt of an SGW evaluation trigger, and if the estimated load is too high, skipping performing of steps b) and c).

As another alternative to the list approach, the method may further comprise estimating a current processing load of the MME upon receipt of an SGW evaluation trigger, and if the estimated load is too high, delaying performing of steps b) and c) until the load has decreased beneath a predetermined threshold.

According to the eighth example, the reducing may be performed taking into account at least one of a result of a previous SGW evaluation for the UE, a subscription type of the UE, at least one of currently established services and bearers for the UE, and one of a Tracking Area, TA, and a TA list.

In a ninth example of the third aspect, step b) may further comprise selecting the optimum target SGW for a given bearer. In that case, the selection step may be performed based on at least one of the following: information on capability, configuration, and traffic-offload information of all gateways, GWs, topology information, GW load information, and information on active Access Point Names, APNs, and bearers. In the latter case, the information on capability, configuration, and traffic-offload information may include an ability of the GW to act as a combined SGW/PGW. Further, the topology information may include locations of SGWs, PGWs and Autonomous System Border Router, ASBR, nodes relative to each other.

Moreover, the information on active APNs and bearers may include QoS parameters and requirements. Further, the topology information may be obtained from a topology database in the MME, the database specifying all the GW locations relative to the cells. In the latter case, the database may further store the IP addresses of the GWs.

In the ninth example, when the selection step is performed based on at least one of information on capability, configuration, and traffic-offload information of all GWs, topology information, GW load information, and information on active APNs and bearers, the selecting step may comprise performing steps a) and b) so as to obtain a potential optimal SGW for the UE, wherein step c) may not be performed.

In the ninth example, when the selection step is performed based on at least one of information on capability, configuration, and traffic-offload information of all GWs, topology information, GW load information, and information on active APNs and bearers or when the information on capability, configuration, and traffic-offload information includes an ability of the GW to act as a combined SGW/PGW, the selecting step and the evaluating step may select and evaluate the target SGW for traffic off-load purposes. In the latter case, the method may further comprise configuring a traffic-offload capability of the target SGW directly in the MME. Alternatively, the method may comprise configuring a traffic-offload capability of the target SGW in a Domain Name Server, DNS, together with a traffic policy to which the off-load applies.

In a tenth example of the third aspect, the method may further comprise a functionality for relocation in an enterprise network involving local IP access. As a first alternative, the triggering of evaluation and relocation steps b) and c) may comprise detecting a successful activation of a local connection by the UE, and triggering, if the source SGW is not in an enterprise local GW, the relocation of the source SGW to the local GW as target SGW. In the latter case, the local connection may be an originally remote connection to the local GW having become local upon the UE moving into the enterprise network. As a second alternative, the triggering of evaluation and relocation steps b) and c) may comprise detecting a deactivation of at least one local connection by the UE, and triggering, if the source SGW is not an operator GW the relocation of an enterprise local GW as the source SGW to the operator GW as the target SGW.

In the tenth example, a third alternative may reside in relocating step c) for relocating the source SGW to a local enterprise GW as target SGW being performed, if the UE enters the idle mode. As a fourth alternative, relocating step c) for relocating the source SGW to a local enterprise GW as target SGW may be performed, if the UE becomes connected within the enterprise network and has a local connection. As a fifth alternative, relocating step c) for relocating the source SGW to a local enterprise GW as target SGW may not be performed, if the UE assumes the idle mode in the enterprise network. In the latter case, relocating step c) for relocating the local GW as source SGW to an operator GW as target SGW may be performed, if the UE becomes connected outside the enterprise network, or relocating step c) for relocating the operator GW as source SGW to the local enterprise GW as target SGW may be performed, if the UE becomes connected within the enterprise network and has a local connection.

In the tenth example, at least the relocation step c) may performed during a service request. In that case, relocating step c) for relocating the source SGW to a local GW in the operator network as the target SGW may be performed each time the service request is performed inside the enterprise network and the UE has a local connection. Alternatively, relocating step c) for relocating a local enterprise GW as the source SGW to an operator GW as the target SGW may be performed each time the service request is performed outside the enterprise network.

In an eleventh example of the third aspect, at least the relocation step c) may be performed during a service request. In that case, the method may further comprise, if the service request was network initiated, notifying, from the MME, the source SGW about an address of a current Evolved NodeB, eNB, address of the UE and a Tunnel Endpoint IDentifier, TEID so as to enable the source SGW to forward to the eNB any buffered downlink data. Further, the method may comprise notifying, from the MME, the target SGW about an address of a current eNB address of the UE and a TEID.

It is to be noted that the MME/SGSN, source SGW or UE may implement any of the technical details set forth for the method aspect hereinabove, and thus achieves the same advantages. In other words, the terminal device may comprise further components adapted to perform any of the method steps disclosed herein.

The UE may be a mobile or a stationary terminal. As an example, the client may be realized in the form of a mobile (smart-)phone, a notebook computer, a laptop, a subnotebook, a Personal Digital Assistant (PDA), a tablet PC (such as an iPad™), or any hybrids thereof (for example, a Blackberry™ being a hybrid of a smartphone and a PDA), and the like.

BRIEF DESCRIPTION OF THE DRAWINGS

The embodiments of the present invention are described herein below with reference to the accompanying drawings, in which:

FIG. 5 shows suboptimal traffic paths resulting from subscriber movement;

FIG. 6A shows the components comprised in a first embodiment of an MME/SGSN, target/source SGW and eNB according to the present invention;

FIG. 6B shows the interaction between the components shown in FIG. 6A;

FIG. 6C shows a method of the first embodiment according to the present invention;

FIG. 7A shows the components comprised in a second embodiment of an MME/SGSN, target/source SGW and eNB according to the present invention;

FIG. 7C shows a method of the second embodiment according to the present invention;

FIG. 8A shows the components comprised in a third embodiment of an MME/SGSN, target/source SGW, eNB and UE according to the present invention;

FIG. 8C shows additional components comprised in the third embodiment of an MME/SGSN, target/source SGW, eNB and UE according to the present invention;

FIG. 8E shows more additional components comprised in the third embodiment of an MME/SGSN, target/source SGW, eNB and UE according to the present invention;

FIG. 9A shows the components comprised in a fourth embodiment of an MME/SGSN, target/source SGW, eNB and UE according to the present invention;

DETAILED DESCRIPTION

Figure 1:
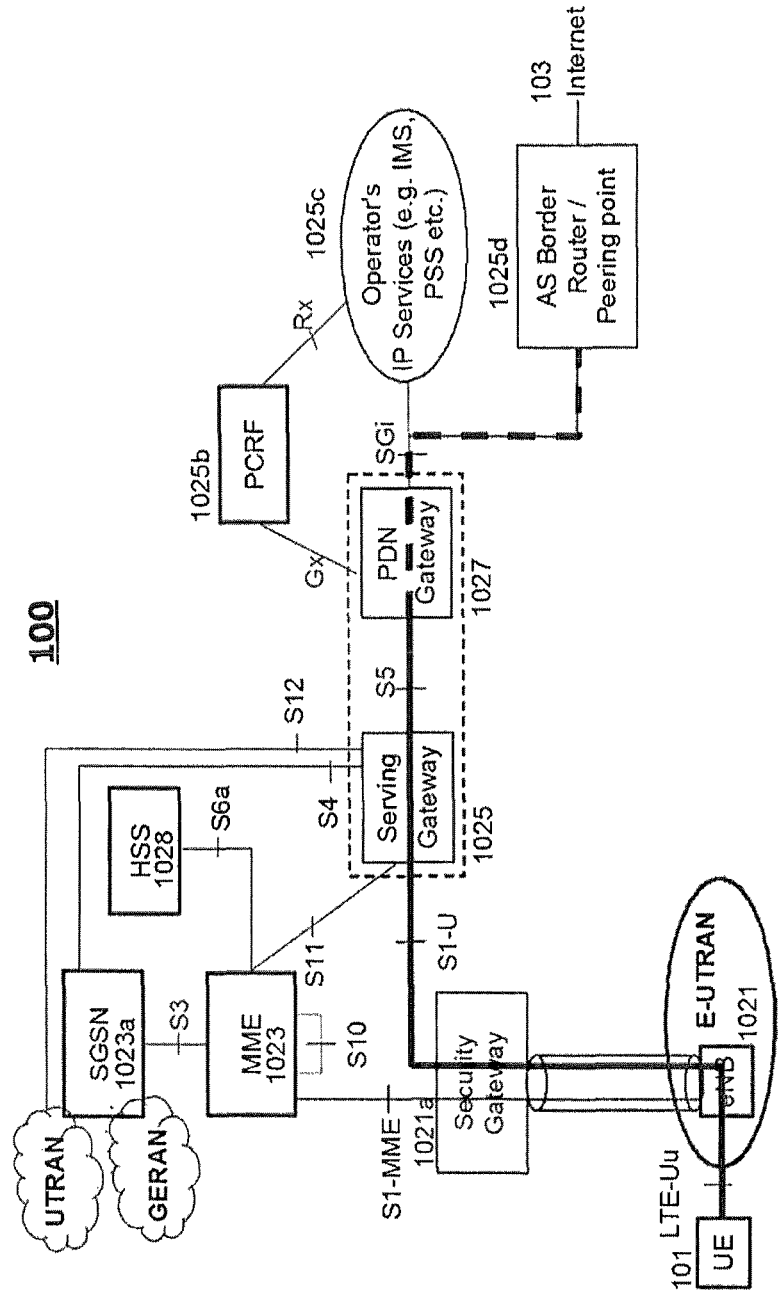
FIG. 1 shows the simplified EPS non-roaming architecture for 3GPP access.
Figure 2:
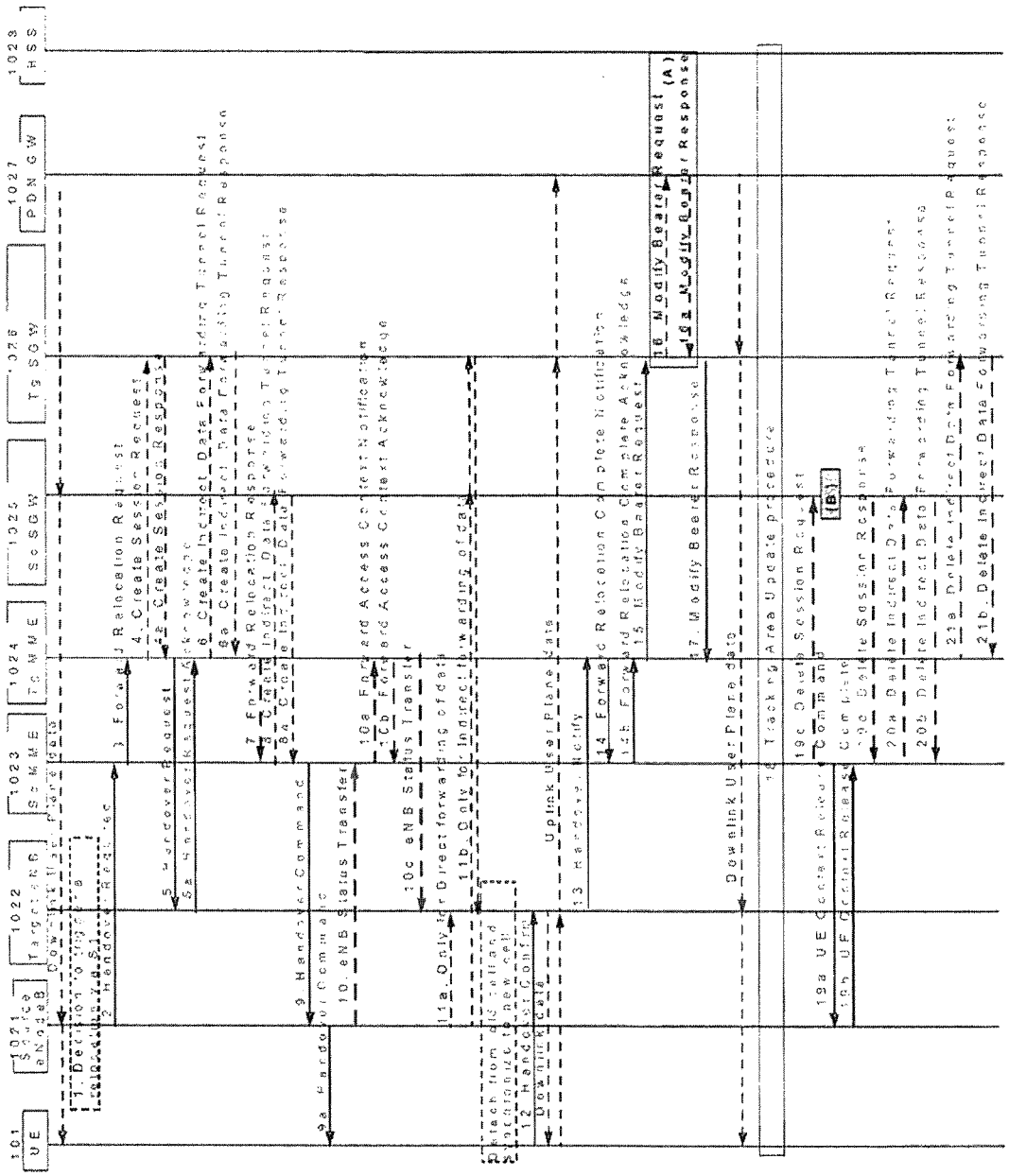
FIG. 2 shows the S1-based handover with SGW relocation.

In the following description, for purposes of explanation and not limitation, specific details are set forth (such as particular signalling steps) in order to provide a thorough understanding of the technique presented herein. It will be apparent to one skilled in the art that the present technique may be practised in other embodiments that depart from these specific details. For example, while the embodiments will primarily be described in the context of an MME/SGSN; however, this does not rule out the use of less or more devices to implement the present invention.

Moreover, those skilled in the art will appreciate that the services, functions and steps explained herein below may be implemented using software functioning in conjunction with a programmed microprocessor, or using an Application Specific Integrated Circuit (ASIC), a Digital Signal Processor (DSP) or general purpose computer. It will also be appreciated that while the following embodiments are described in the context of methods and devices, the technique presented herein may also be embodied in a computer program product as well as in a system comprising a computer processor and a memory coupled to the processor, wherein the memory is encoded with one or more programs that execute the services, functions and steps disclosed herein.

First Embodiment

FIGS. 6A and 6B show a first embodiment of an apparatus 2023 (as an example, an MME or SGSN) for relocating an SGW 2025 associated to a UE (not shown). FIG. 6A illustrates the components comprised in the apparatus 2023 (and optionally, an eNB 2021, a source SGW 2025 and a target SGW 2026), and FIG. 6B shows the interaction between the components shown in FIG. 6A.

As shown in FIG. 6A, the apparatus 2023, the eNB 2021, the source SGW 2025 and the target SGW 2026 each comprise an own core functionality (e.g. a central processing unit (CPU), a dedicated circuitry or a software module) $202x1$ (wherein x=1, 3, 5 or 6), a memory (and/or database) $202x2$, a(n optional) transmitter $202x3$ and a(n optional) receiver $202x4$. In turn, the apparatus 2023 comprises a trigger 20235, an updater 20236, an optional performer 20237 and an optional continuer 20238.

As indicated by the dashed extensions of the functional blocks of the CPUs $202x1$ (wherein x=1, 3, 5 or 6), the trigger 20235, the updater 20236, the performer 20237 and the continuer 20238 (of the apparatus 2023), as well as the memory $202x2$, the transmitter $202x3$ and the receiver $202x4$ may at least partially be functionalities running on the CPUs $202x1$, or may alternatively be separate functional entities or means controlled by the CPU $202x1$ and supplying the same with information.

The CPUs $202x1$ may be configured, for example by software residing in the memories $202x2$, to process various data inputs and to control the functions of the memory $202x2$, the transmitter $202x3$ and the receiver $202x4$ (as well as the trigger 20235, the updater 20236, the performer 20237 and the continuer 20238 (of the apparatus 2023). The memory $202x2$ may serve for storing code means for carrying out the methods according to the aspects disclosed herein, when run on the CPU $202x1$.

It is to be noted that the transmitter $202x3$ and the receiver $202x4$ may alternatively be provided as an integral transceiver, as is shown in FIG. 6A. It is further to be noted that the transmitters/receivers may be implemented as physical transmitters/receivers for transceiving via an air interface (e.g., between the network apparatus 2023 and the UE 201), as routing entities/interfaces between network elements (e.g., for transmitting/receiving data packets between apparatus 2023 and SGW 2025, 2026 when disposed as separate network functionalities), as functionalities for writing/reading information into/from a given memory area (e.g. between eNB 2021 and SGW 2025, 2026 when disposed as an integral network entity 2001) or as any suitable combination of the above. At least one of the above-described trigger 20235, updater 20236, performer 20237 and continuer 20238 (of the apparatus 2023), as well as the apparatus 2023 itself, or the respective functionalities carried out, may also be implemented as a chipset, module or subassembly.

As shown in FIG. 6C, the following steps are performed for each session (i.e., for each PDN connection):

Step 1: The trigger 20235 of the MME 2023 triggers the relocation of the source SGW 2025 by sending a Create Session Request message to the new (target) SGW 2026.

Step 2: The target SGW 2026 may update the PGW (not shown) by a Modify Bearer Request message and the PGW responds with a Modify Bearer Response message. This causes the PGW 2027 to start sending downlink packets via the target SGW 2026.

Step 3: The target SGW 2026 acknowledges the request by sending a Create Session Response message to the receiver 20234 of the MME 2023. The message includes the uplink S1 GTP endpoints of the target SGW 2026.

Steps 4 and 5: The updater 20236 of the MME 2023 updates the IP address of the target SGW 2026 and the TEID information in the eNB 2021 used for uplink by using UE context modification request to which the eNB 201 may respond to. This causes new uplink data to follow the new path via the target SGW 2026.

In case the procedure is executed in IDLE mode, steps 4 and 5 may be skipped.

Step 6: The transmitter 20233 of the MME 2023 deletes the session in the source SGW 2025 to free up unused resources by transmitting a Delete Session Request.

Note that the proposed procedure in the first embodiment may use messages that are already standardized, except for message(s) in steps 4 and 5 which may require the definition of a new Information Element (IE) to an existing message (or the definition of a new message).

As an alternative, it may be possible to bundle steps 4 and 5 together for all PDN connections to reduce signalling to the eNB 2021. In that case, step 6 would be executed after steps 4 and 5 for all PDN connections.

In case the SGW relocation is triggered by the activation of a new PDN connection, it is possible to combine the two procedures in the following way as a further optimization:

The receiver 20233 of the MME 2023 may first get (or receive) a request for the activation of a new PDN connection and determines to relocate the SGW as a result of that.

The performer 20237 of the MME 2023 may perform the SGW relocation procedure for the existing connections.

Finally, the continuer 20238 of the MME 2023 may continue with the activation of the new PDN connection using the target SGW.

The advantage of this optimization is that the new PDN connection will use the new target SGW 2026 from the beginning, avoiding the use of the old SGW 2025 for a short period of time.

For $3^{rd}$ Generation (3G) direct tunneling, the procedure is the same with the following small differences:

Instead of the eNB 2021, a Radio Network Controller (RNC) may be provided.

Instead of the MME 2023, an SGSN 2023 may be provided.

Steps 4 and 5 may use the Radio Access Bearer (RAB) assignment request/response messages.

In the case of $2^{nd}$ Generation (2G) or 3G without direct tunneling, the SGSN 2023 will be automatically aware of the address and TEID of the new SGW 2026 where uplink user plane packets should be sent to, so in that case there is no need for steps 4 and 5.

Note that it is possible to use another message between the (e)NB 2021 and the MME/SGSN 2023 or to define a new message type. Messages in steps 4 and 5 may require new functionality. Other messages in the procedure may already exist.

Second Embodiment

Figure 7B:
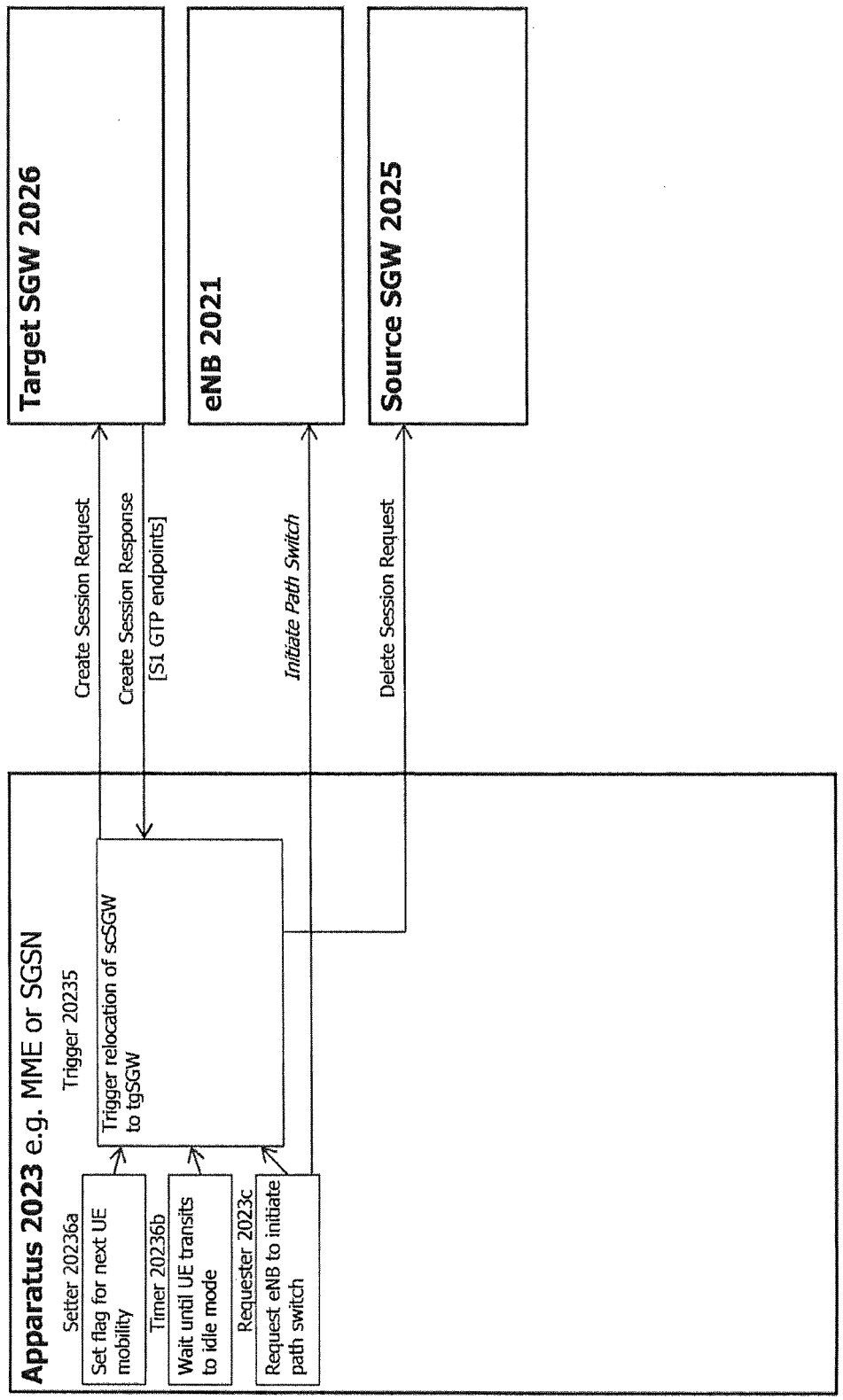
FIG. 7B shows the interaction between the components shown in FIG. 7A.

FIGS. 7A and 7B show a second embodiment of an apparatus 2023 (as an example, an MME or SGSN) for relocating an SGW 2025 associated to a UE (not shown). FIG. 7A illustrates the components comprised in the apparatus 2023 (and optionally, the eNB 2021, the source SGW 2025 and the target SGW 2026), and FIG. 7B shows the interaction between the components shown in FIG. 7A.

As shown in FIG. 7A, the apparatus 2023, the eNB 2021, the source SGW 2025 and the target SGW 2026 each comprise an own core functionality $202x1$ (wherein x=1, 3, 5 or 6), a memory (and/or database) $202x2$, a(n optional) transmitter $202x3$ and a(n optional) receiver $202x4$. In turn, the apparatus 2023 comprises the trigger 20235, a setter 20236a, a timer 20236b and a requester 20236c.

As indicated by the dashed extensions of the functional blocks of the CPUs $202x1$ (wherein x=1, 3, 5 or 6), the trigger 20235, the setter 20236a, the timer 20236b and the requester 20236c (of the apparatus 2023), as well as the memory $202x2$, the transmitter $202x3$ and the receiver $202x4$ may at least partially be functionalities running on the CPUs $202x1$, or may alternatively be separate functional entities or means controlled by the CPU $202x1$ and supplying the same with information.

The CPUs $202x1$ may be configured, for example by software residing in the memories $202x2$, to process various data inputs and to control the functions of the memory $202x2$, the transmitter $202x3$ and the receiver $202x4$ (as well as the trigger 20235, the setter 20236a, the timer 20236b and the requester 20236c (of the apparatus 2023). The memory $202x2$ may serve for storing code means for carrying out the methods according to the aspects disclosed herein, when run on the CPU $202x1$.

It is to be noted that the transmitter $202x3$ and the receiver $202x4$ may alternatively be provided as an integral transceiver, as is shown in FIG. 7A. It is further to be noted that the transmitters/receivers may be implemented in the forms described in the first embodiment. At least one of the above-described trigger 20235, setter 20236a, timer 20236b and requester 20236c (of the apparatus 2023), as well as the apparatus 2023 itself, or the respective functionalities carried out, may also be implemented as a chipset, module or subassembly.

Another alternative to perform SGW relocation for the purpose of transport optimization (or other reasons, such as Operation and Maintenance, O&M, actions, SGW failure or load balancing) is that the setter 20236a of the MME 2023 may set a flag for the given UE selected for SGW relocation, and the next time this UE undergoes a mobility procedure, this flag will, by the trigger 20235 of the MME 2023, trigger the SGW reallocation in the MME 2023 as defined for the existing mobility procedures.

Yet another alternative is that the timer 20236b causes the MME 2023 to wait until the selected UE becomes idle and then performs the SGW relocation in idle mode as described above. This may also be a part of the flow chart in FIG. 8G. However, this may incur an unpredictable delay and hence it may not be useable for enterprise local IP access. Due to the delay, it also has higher complexity in the MME 2023 to manage the process.

Figure 3:
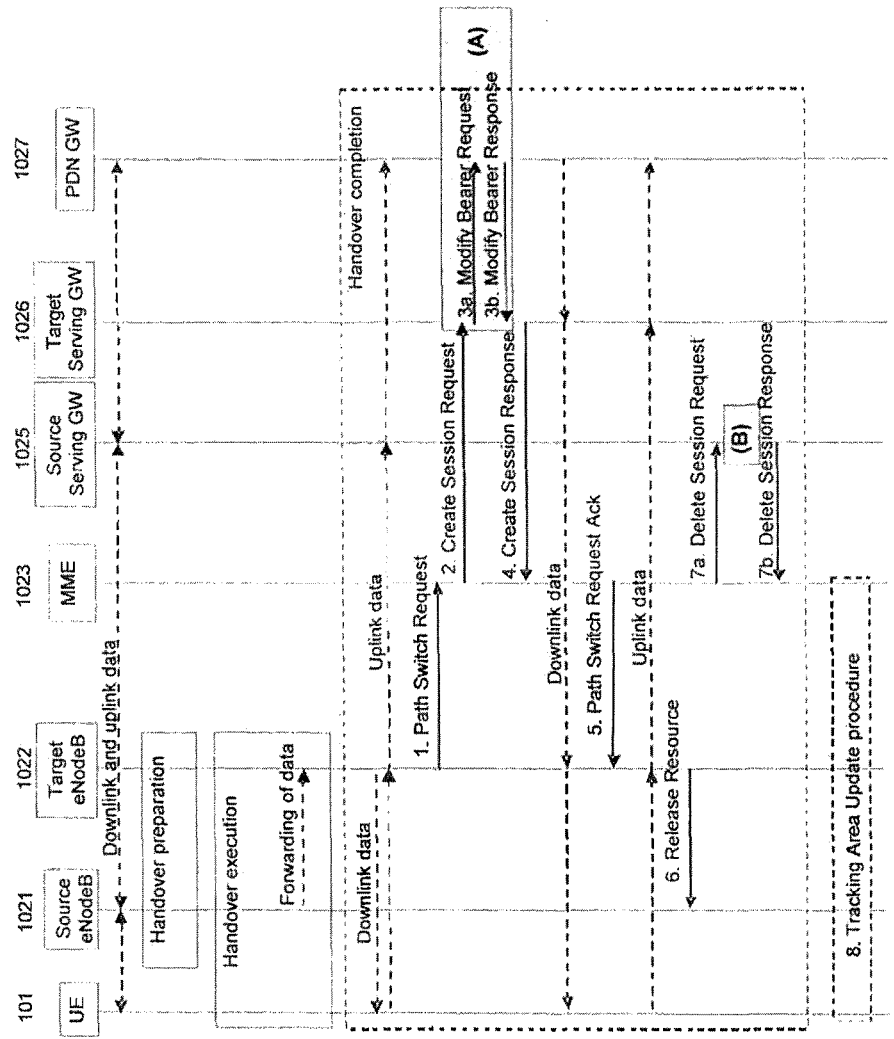
FIG. 3 shows the X2-based handover with SGW relocation.
Figure 4:
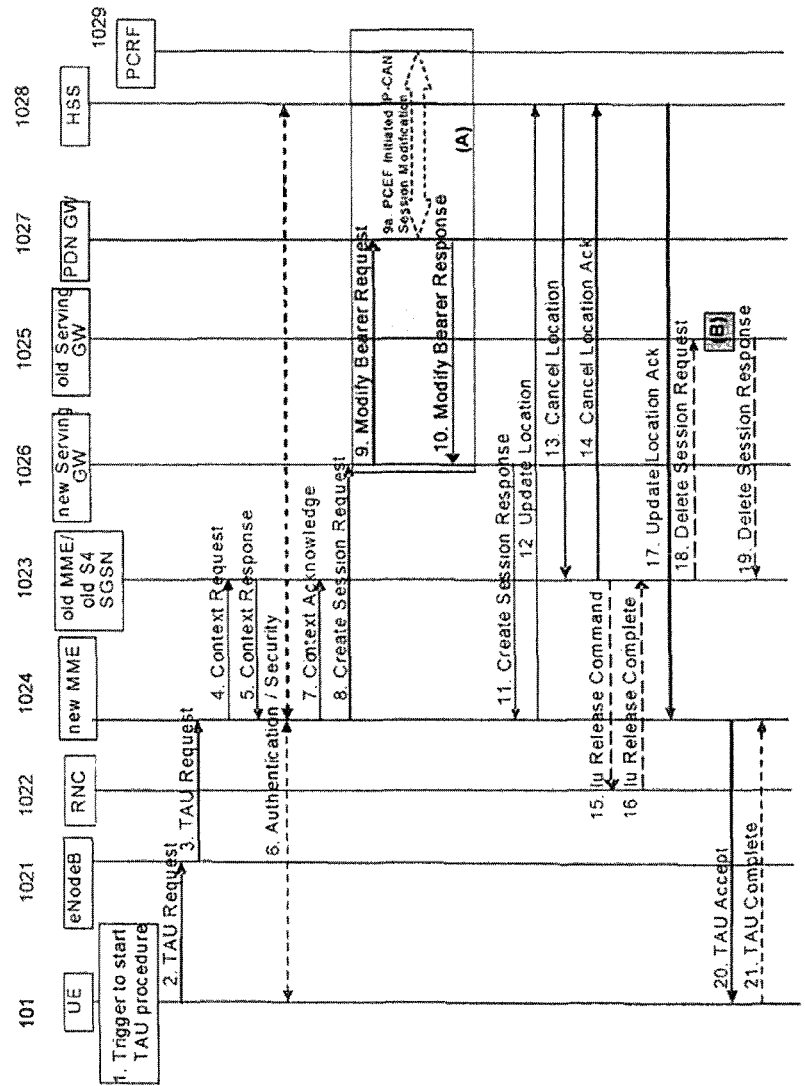
FIG. 4 shows the Tracking Area Update (TAU) with SGW relocation.

Another alternative may reside in using a mechanism by the MME 2023 to enforce a path switch request from the eNB based on which the process in FIG. 7C may be applied again for SGW relocation. This would comprise that the requester 20236c of the MME 2023 sends a new message to the eNB 2021 (step 1), requesting the eNB 2021 to initiate a path switch by sending a path switch request to the MME 2023 (step 2). This would trigger steps (or messages) 1 to 5, 7a and 7b in the flow chart of FIG. 3. The procedure could be proprietary or standardized. In the latter case, the new message from the MME 2023 to the eNB 2021 would have to be standardized. This procedure is illustrated in FIG. 7C, wherein it is to be noted that steps 2 to 9 of FIG. 7C correspond to steps 1 to 5, 7a and 7b in FIG. 3.

However, this alternative is not more complex than the proposed main alternative in the first embodiment above, since it requires the definition of a new message on the S1 interface. Compared to that, it seems simpler to pass the necessary information to the eNB 2021 already in a new S1 parameter according to the first embodiment. Another issue is that this approach is limited to LTE and not applicable in 3G where there is no corresponding procedure to the X2 handover.

Third Embodiment

Figure 8B:
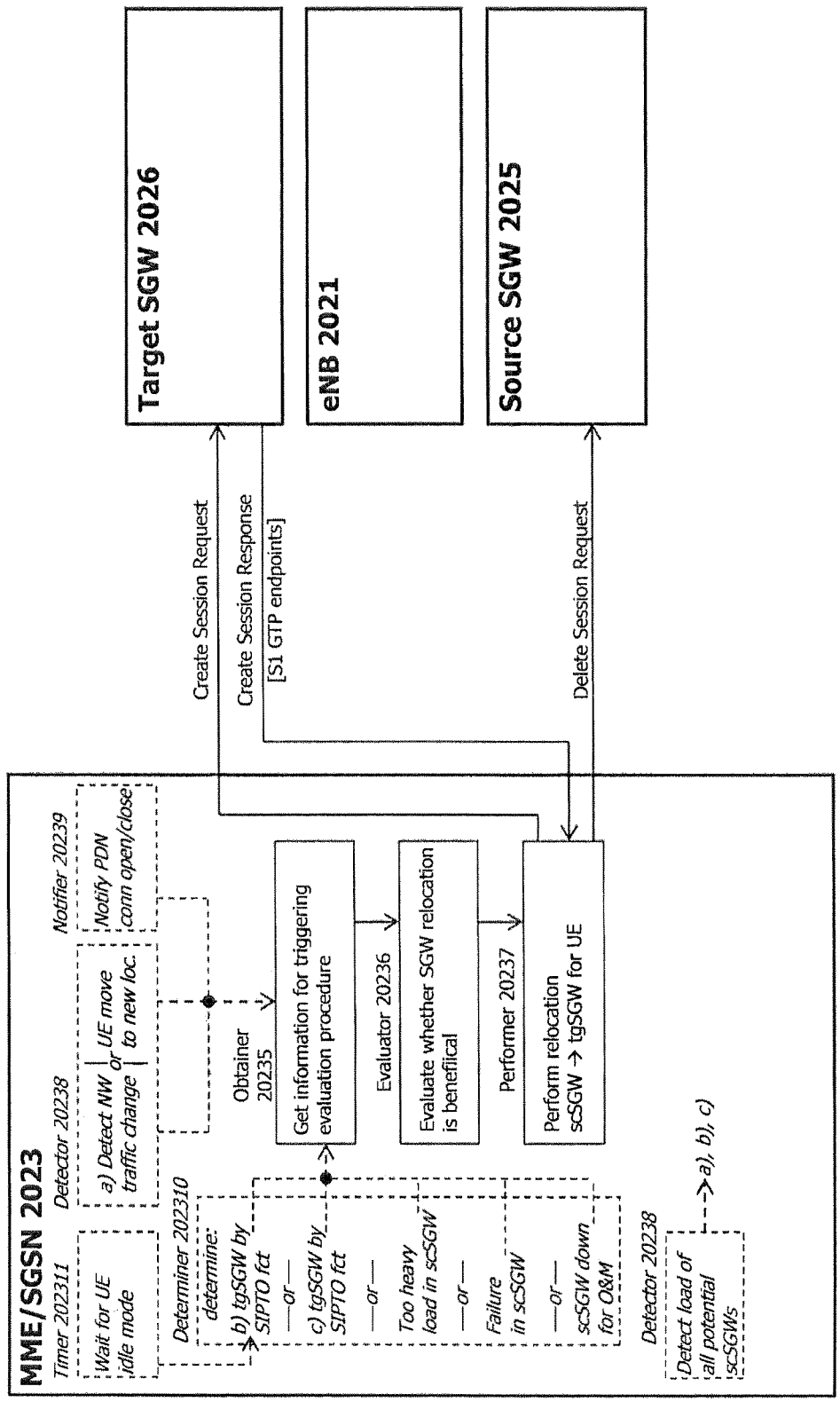
FIG. 8B shows the interaction between the components shown in FIG. 8A.
Figure 8D:
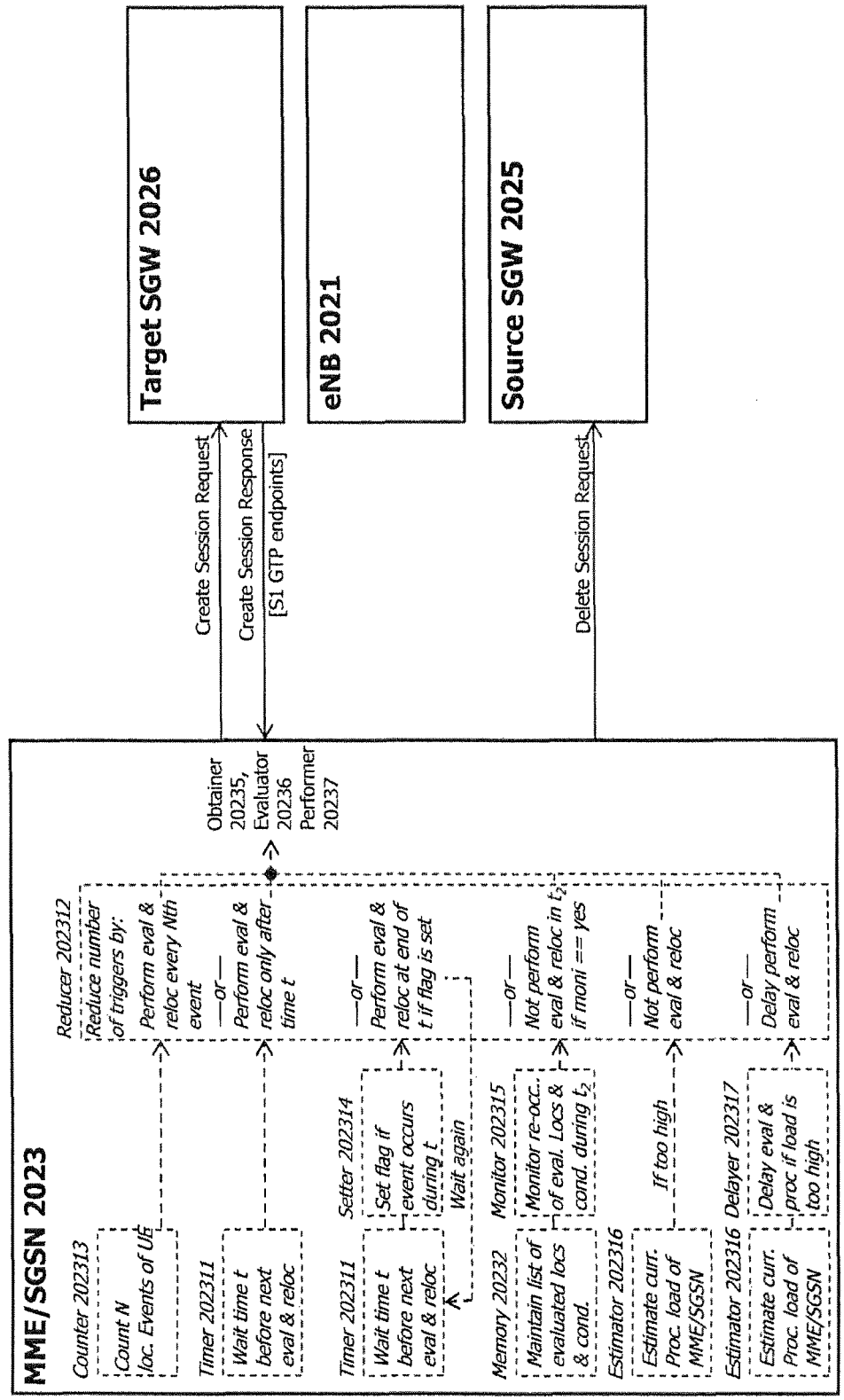
FIG. 8D shows the interaction between the components shown in FIG. 8C.
Figure 8F:
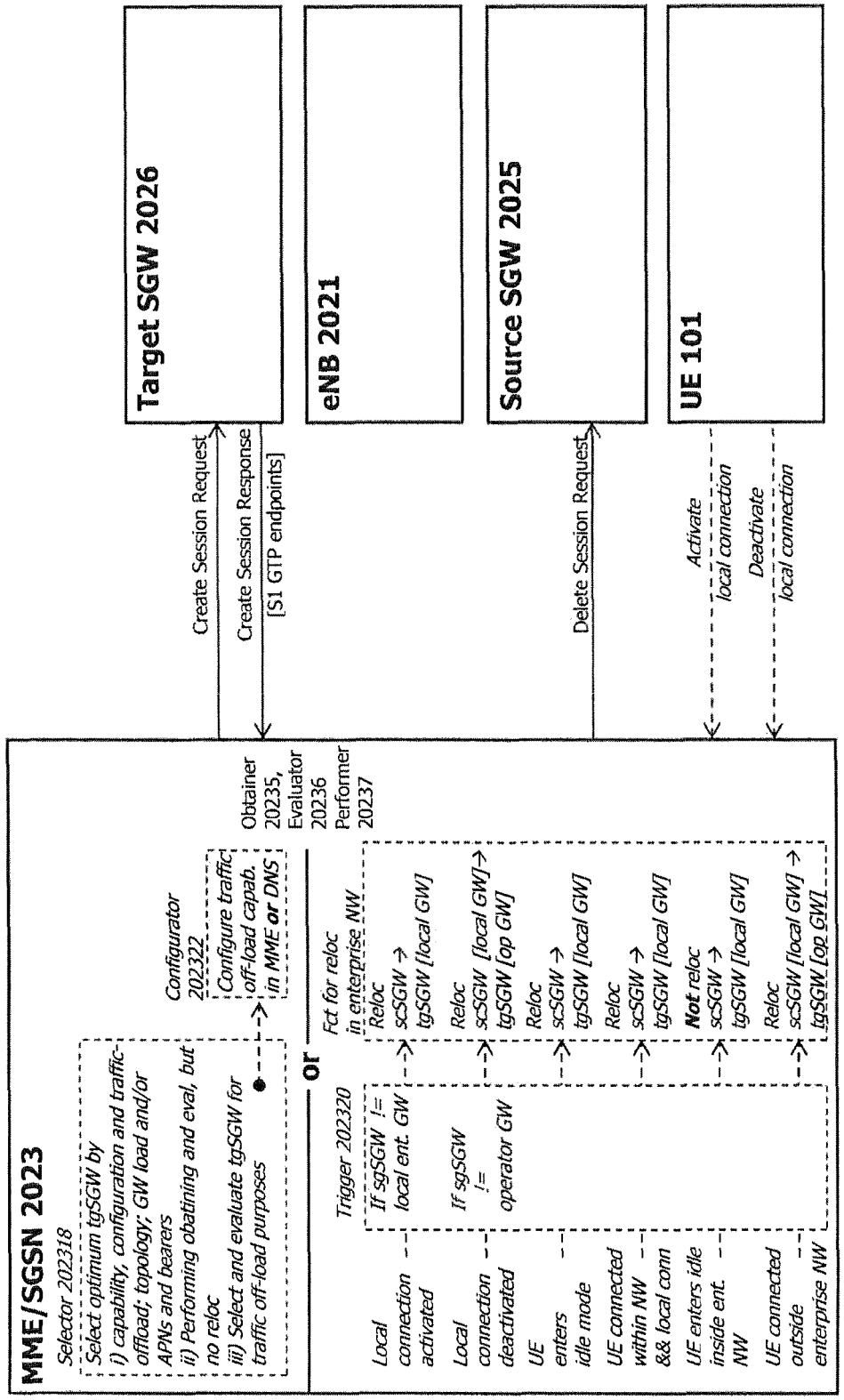
FIG. 8F shows the interaction between the components shown in FIG. 8E.

FIGS. 8A, 8B, 8C, 8D, 8E and 8F show a third embodiment of the apparatus 2023 (as an example, MME or SGSN) for relocating an SGW 2025 associated to a UE 201. FIGS. 8A, 8C and 8E illustrate the components comprised in the apparatus 2023 (and optionally, the UE 201, the eNB 2021, the source SGW 2025 and the target SGW 2026), and FIGS. 8B, 8D and 8F show the interaction between the components shown in FIGS. 8A, 8C and 8E.

As shown in FIGS. 8A, 8C and 8E, the apparatus 2023, the UE 201, the eNB 2021, the source SGW 2025 and the target SGW 2026 each comprise an own core functionality 20x1 (wherein x=1, 21, 23, 25 or 26), a memory (and/or database) 20x2, a(n optional) transmitter 20x3 and a(n optional) receiver 20x4. As shown in FIG. 8A, the apparatus 2023 comprises an obtainer 20235, an evaluator 20236, a performer 20237, an optional detector 20238, an optional notifier 20239, an optional determiner 202310 and an optional timer 202311. As shown in FIG. 8C, the apparatus 2023 comprises, in addition or alternatively, an optional reducer 202312, an optional counter 202313, an optional setter 202314, an optional monitor 202315, an optional estimator 202316 and an optional delayer 202317. Finally, as shown in FIG. 8E, the apparatus 2023 (further) comprises, in addition or alternatively, an optional selector 202318 (as a part of the evaluator 20236), an optional trigger 202320 and an optional configurator 202322; and the UE 201 comprises an optional activator 20119 and an optional deactivator 20121.

As indicated by the dashed extensions of the functional blocks of the CPUs 20x1 (wherein x=1, 21, 23, 25 or 26), the obtainer 20235, the evaluator 20236, the performer 20237, the detector 20238, the notifier 20239, the determiner 202310, the timer 202311, the reducer 202312, the counter 202313, the setter 202314, the monitor 202315, the estimator 202316, the delayer 202317, the selector 202318, the trigger 202320 and the configurator 202322 (of the apparatus 2023) and the activator 20119 and the deactivator 20121 (of the UE 201), as well as the memory 20x2, the transmitter 20x3 and the receiver 20x4 may at least partially be functionalities running on the CPUs 20x1, or may alternatively be separate functional entities or means controlled by the CPU 20x1 and supplying the same with information.

The CPUs 20x1 may be configured, for example by software residing in the memories 20x2, to process various data inputs and to control the functions of the memory 20x2, the transmitter 20x3 and the receiver 20x4 (as well as the obtainer 20235, the evaluator 20236, the performer 20237, the detector 20238, the notifier 20239, the determiner 202310, the timer 202311, the reducer 202312, the counter 202313, the setter 202314, the monitor 202315, the estimator 202316, the delayer 202317, the selector 202318, the trigger 202320 and the configurator 202322 (of the apparatus 2023) and the activator 20119 and the deactivator 20121 (of the UE 201)). The memory 20x2 may serve for storing code means for carrying out the methods according to the aspects disclosed herein, when run on the CPU 20x1.

It is to be noted that the transmitter 20x3 and the receiver 20x4 may alternatively be provided as an integral transceiver, as is shown in FIGS. 8A, 8C and 8E. It is further to be noted that the transmitters/receivers may be implemented in the forms described in the first embodiment. At least one of the above-described obtainer 20235, evaluator 20236, performer 20237, detector 20238, notifier 20239, determiner 202310, timer 202311, reducer 202312, counter 202313, setter 202314, monitor 202315, estimator 202316, delayer 202317, selector 202318, trigger 202320 and configurator 202322 (of the apparatus 2023) and activator 20119 and deactivator 20121 (of the UE 201), as well as the apparatus 2023 or UE 201 itself, or the respective functionalities carried out, may also be implemented as a chipset, module or subassembly.

Figure 8G:
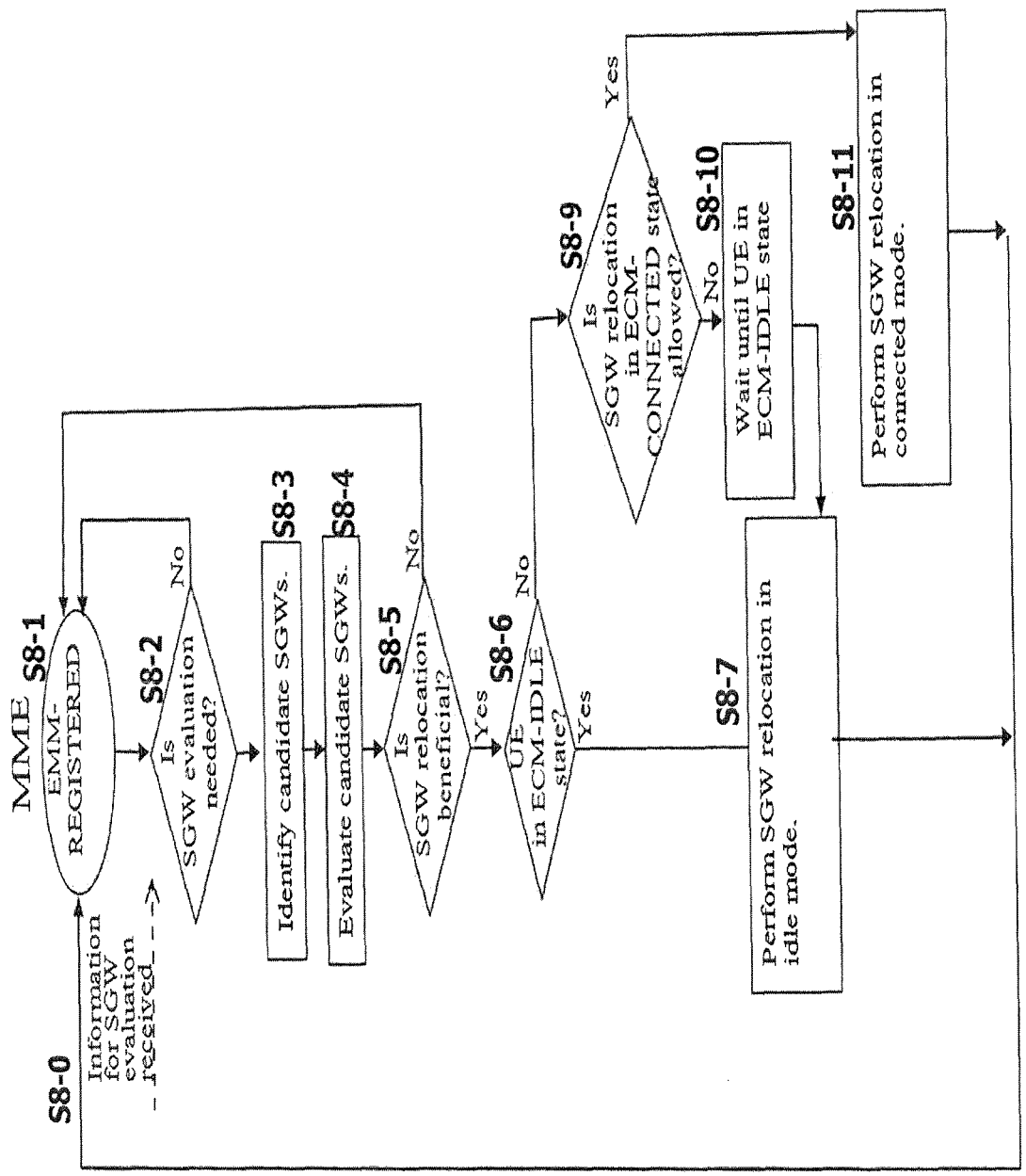
FIG. 8G shows a method of the third embodiment according to the present invention.

The approach is depicted in the flowchart in FIG. 8G. It consists of 3 important phases:

The obtainer 20235 of the MME 2023 gets the information that triggers the evaluation procedure for SGW relocation (step 8-0).

The evaluator 20236 of the MME 2023 evaluates whether SGW relocation is beneficial (step 8-5).

The performer 20237 of the MME 2023 performs the SGW relocation if the evaluation above is positive (steps 8-7 and 8-11).

The evaluation procedure may trigger a SGW relocation procedure if the result of the evaluation is a different SGW 2026 than the currently selected SGW 2025 (optionally with a required margin in terms of how much better the different SGW is than the old one).

Getting Information for SGW Evaluation (step 8-0)

Several circumstances may trigger the MME 2023 (or SGSN 2023 in case of GERAN or UTRAN) to initiate the SGW relocation procedure. There are seven examples to this effect.

FIRST EXAMPLE

The detector 20238 of the MME 2023 detects that the traffic volume or traffic compositions generated by the UE has changed significantly (either the destination or the composition of the traffic, e.g., by opening/closing GBR bearers).

A typical example is if the UE 201 has several PDN connections to more than one PGW and the traffic change makes another PGW become more important than the one combined with the current SGW 2025. Then relocating the SGW so that it is combined with the most important PGW would be beneficial.

The MME 2023 may be made aware of changed traffic volumes by collecting long- or short-term traffic statistics from the subscriber. The former would be useful e.g., to infer whether a certain subscriber generates different traffic patterns to different PGWs in different times of day (or days of week). The latter would be used to infer sudden or unexpected changes in subscriber behaviour. However, it is suggested, that in the simplest variant the detector 20238 of the MME 2023 would just detect the changes in the subscriber traffic by collecting information about the opened/closed bearers (QoS Class Indicator (QCI) of the bearers may be a good indicator of the traffic type).

SECOND EXAMPLE

The receiver 20233 of the MME 2023 receives that the UE 201 opens a new PDN connection or closes an existing one (the MME 2023 is involved in the signalling so it gets notified by any such event).

Also in this situation a typical example is that after the change of PDN connectivity, the current SGW 2025 is no longer optimal, e.g. because it is no longer combined with the most important PGW or no longer combined with any PGW. Then relocating the SGW so that it is combined with the most important PGW would be beneficial.

THIRD EXAMPLE

When the UE 201 transitions from idle to connected mode, the detector 20238 of the MME 2023 detects that the UE 201 has moved to a new location (e.g. indicated by a cell identity (ECGI) or Tracking Area Identity (TAI) conveyed from an eNB 2021 e.g. in an S1AP message), where the user plane transmission path could potentially be optimized by SGW relocation (even if the UE 201 still remains in the same SGW SA).

FOURTH EXAMPLE

Due to the Selected IP Traffic Offload (SIPTO) feature, the SGW relocation needs to take place to a special SGW (thus, the determiner 202310 of the MME 2023 determines the target SGW 2026), and the relocation needs to be done at a different time (such as in idle mode) in order not to disturb on-going traffic flows.

FIFTH EXAMPLE

The determiner 202310 of the MME 2023 determines that a certain SGW 2025 is too heavily loaded (it either sends overload indication or the notifier 20239 of the MME 2023 receives an indirect notification by e.g., rejecting some requests) and the determiner 202310 of the MME 2023 decides that it is preferable to relocate some UEs 201 to other SGWs 2026.

SIXTH EXAMPLE

The determiner 202310 of the MME 2023 determines that a failure occurs in the SGW 2025 of the UE 201, so that the SGW 2023 loses parts of its capacity, which makes it preferable to relocate UEs to other SGWs. The determiner 202310 of the MME 2023 determines (or is notified of) the changes by the O&M system (or indirectly by overload indications or rejections from the SGW 2025).

SEVENTH EXAMPLE

The determiner 202310 of the MME 2023 determines that due to scheduled O&M actions, the SGW 2025 of the UE 201 will soon wholly or partly be taken down for service/maintenance or upgrade and to avoid service interruptions, UEs allocated to the SGW should be relocated to other SGWs 2026.

The receiver 20233 of the MME 2023 should get SGW load information in order to be able to off-load SGWs considered to be loaded above an allowed threshold. This generally implies getting two quantities: the capacity limit of each GW, and the current load of each GW.

EIGHTH EXAMPLE

Note that the UE 201 location may be learnt by the MME during handovers, TAUs or Service Requests hence the triggers that indicate UE 201 movements are rather frequent. Therefore, as shown in FIGS. 8C and 8D, the reducer 202312 of the MME 2023 reduces the number of triggers to the SGW evaluation procedure based on subscriber mobility or traffic changes.

One possibility is to limit the time window when the UE 201 movements may trigger a SGW evaluation (e.g., a five-minute interval every hour during which the UEs giving a trigger are evaluated). However, this may cause that some of the UEs will never be evaluated from the SGW relocation perspective.

An alternative method would be to count the number of location events by the subscriber and perform an evaluation after every $N^{th}$ such event. Alternatively, one may use an "evaluation gap" timer 202311 which prohibits evaluations during a certain time after an evaluation. The timer 202311 of the MME 2023 may be complemented by a flag which is set, by the setter 202314 of the MME 2023, if one or more change has occurred during this "gap" in which case a new evaluation would be performed, by the performer 202317 of the MME 2023, at the end of the gap after which the timer 202311 of the MME 2023 once again would "close" the evaluation possibility for a prescribed time. The duration of the timer could be set such that the total rate of evaluations becomes acceptable.

If the number of triggers for the SGW evaluation is still high, the load caused by SGW evaluations may further be reduced by:

Maintaining, by the memory 20232 of the MME 2023, a list of already evaluated locations or conditions; Monitoring, by the monitor 202315, if they occur again within a certain time, the performer 202317 should not trig an evaluation. The time during which a condition is "uninteresting" could be set such that the total rate of evaluations becomes acceptable.

Restrict the SGW evaluations when the load (mainly the processing load) of the MME is high. With this example, the estimator 202316 of the MME 2023 estimates the current processing load of the SGW 2025 every time it receives a SGW evaluation trigger. If the load is too high, the performer 202317 of the MME 2023 either skips the SGW evaluation or delays it, by the delayer 202317 of the MME 2023, until the load has decreased below a threshold.

The decision on SGW evaluation could further be modulated by:

The result of the previous SGW evaluation for the given UE.

The UE subscription type.

Currently established services/bearers for the given UE.

Current Tracking Area (TA) or TA list.

The above restrictions/limitations of the SGW evaluation frequency would of course exclude cases where SGW evaluations have to be performed, e.g. SGW evaluation in conjunction with O&M action involving the current SGW, or SGW evaluation in conjunction with attaching UEs.

NINTH EXAMPLE

As shown in FIGS. 8E and 8F, the role of the SGW evaluation procedure is to select, by the selector 202318, the most optimal SGW 2026 for a given bearer. This procedure is based on extensive information in the MME:

- GW capability and configuration information, including capability to act as a combined SGW/PGW node and traffic off-load capability.
- Topology information, i.e., the locations of SGW, PGW and ASBR nodes relative to each other as well as relative to the eNB the UE is presently attached to.
- GW load information.
- Information about active APNs and bearers including QoS parameters and requirements.

The first step is the identification of the candidate SGWs 2026 that requires basically the same capability and configuration information that is needed at attach, so the information may be received by the standard DNS procedure as described in 3GPP TS 29.303 V8.2.0.

In the next step, the evaluator 20236 evaluates the SGWs based on the above information, and the selector 202318 selects the most optimal SGW 2026 considering all criteria.

The user plane path evaluation and optimization procedure may be based on information about the location of the GWs in the network topology. One possibility is to use a topology database 20232 in the MME 2023 specifying the position of all GWs (including their IP addresses) relative to the different cells.

A simpler solution is that the obtainer 20235 of the MME 2023 obtains the would-be optimal SGW for the given UE by initiating the same process as for a SGW reallocation, but without the performer 20237 effectively performing the reallocation, just performing the selection phase. Note that performing the standard DNS procedure as described in 3GPP TS 29.303 V8.2.0 would typically not yield enough information to select the most optimal SGW.

Moreover, assuming that the SGW selection process in the MME 2023 may combine a number of "soft" selection criteria when evaluating (by evaluator 20236) the candidate GWs 2026 (i.e., not only the placement in the topology, but also other information like load information, QoS requirement, combined node etc.), all information available in the MME may be reused in the evaluation procedure.

A specific case that should be mentioned is the evaluation of SGWs for traffic off-load purposes. Methods for selected IP traffic off-load from the mobile network close to the attachment point (i.e., typically below configured PGWs in the network) are currently under standardization). An appropriate node where the off-load function may be placed or connected with is the SGW, because it has:

- Bearer information.
- Support for mobility below the SGW.
- Support for I-RAT handovers.
- Charging support.
- Etc.

It is, however, not likely that all SGWs in a network would connect to such a traffic off-load function. One possible solution for SGW selection is to configure (by configurator 202322 of the MME 2023) the traffic off-load capability of the SGWs either directly in the MME or in the DNS together with the traffic policy on which off-load applies. The SGW evaluation process would then take also this information into account in selecting a proper SGW for a given bearer or PDN connection. Note that such optimization may be very efficient not only during attach, but e.g., also during subscriber mobility.

Also, closing PDN connections or bearers may make off-load capability no longer necessary, thus allowing for the selection of a more optimal SGW on the transport path.

Regarding SGW relocation for node off-load purposes, it should be noted that the purpose is to relocate already allocated users to other SGWs 2026 in order to obtain a more optimal distribution of users, taking the above criteria and potential desired benefits into account. Such re-location decisions may be made proactively, relocating a batch of subscribers in order to free capacity for coming subscribers which may be more optimal to allocate to the concerned SGW. More likely, however, the relocation decisions would be made on a case-by-case basis, i.e. when a user is to be allocated to a GW, the MME 2023 may consider whether it would be beneficial to relocate another user in order to make the required capacity available for the new user.

Note that special care should be taken when relocating SGWs with off-load capability (SIPTO, Selected IP Traffic Offload) due to the fact that on-going flows cannot be relocated to a new SGW (the traffic off-load function acts as a local anchor for the off-loaded flows e.g., through network address translating (NAT-ting) the flows to the external network). Therefore, in the cases when it is suspected that a part of the subscriber traffic is off-loaded through the given SGW 2025, special care should be taken not to reallocate the SGW until all these flows are completed. This may be done in the simplest way, as suggested in FIG. 8G, by waiting (by the timer 202311) until the given UE 201 becomes idle.

Fourth Embodiment

At the beginning, it is to be noted that the fourth embodiment is closely related to the third embodiment. In other words, the fourth embodiment may be considered as the tenth and eleventh example of the third embodiment.

Figure 9B:
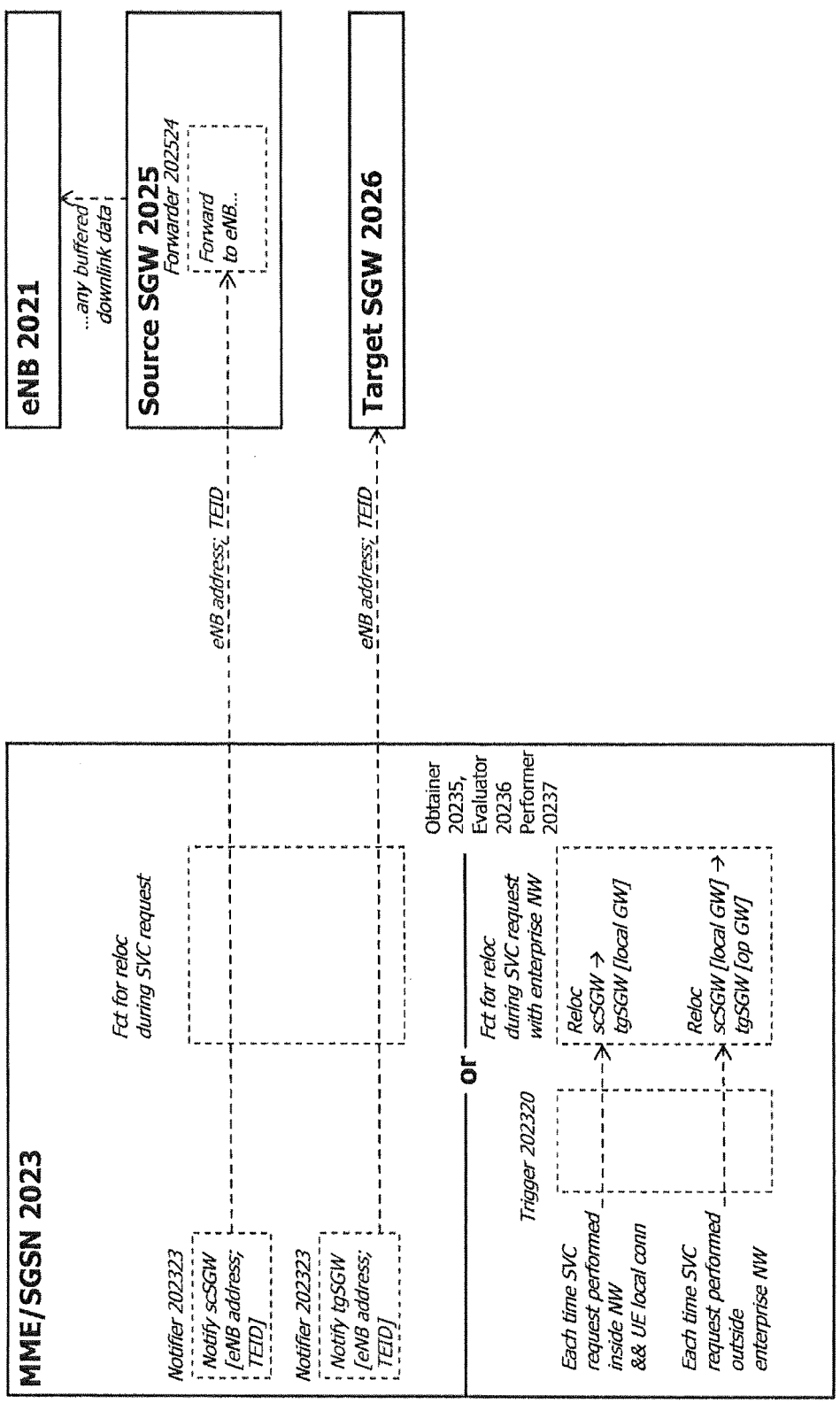
FIG. 9B shows the interaction between the components shown in FIG. 9A.

FIGS. 9A and 9B show a fourth embodiment of an apparatus 2023 (as an example, MME or SGSN) for relocating an SGW 2025 associated to the UE 201. FIG. 9A illustrates the components comprised in the apparatus 2023 (and optionally, the UE 201, the eNB 2021, the source SGW 2025 and the target SGW 2026), and FIG. 9B shows the interaction between the components shown in FIG. 9A.

As shown in FIG. 9A, the apparatus 2023, the UE 201, the eNB 2021, the source SGW 2025 and the target SGW 2026 each comprise an own core functionality $20x1$ (wherein x=1, 21, 23, 25 or 26), a memory (and/or database) $20x2$, a(n optional) transmitter $20x3$ and a(n optional) receiver $20x4$. In turn, the apparatus 2023 comprises the obtainer 20235, the evaluator 20236, the performer 20237 and an optional notifier 202323, and the source SGW 2025 comprises an optional forwarder 202524.

As indicated by the dashed extensions of the functional blocks of the CPUs $20x1$ (wherein x=1, 21, 23, 25 or 26), the evaluator 20236, the performer 20237 and the notifier 202323 (of the apparatus 2023) and the forwarder 202524 (of the source SGW 2025), as well as the memory $20x2$, the transmitter $20x3$ and the receiver $20x4$ may at least partially be functionalities running on the CPUs $20x1$, or may alternatively be separate functional entities or means controlled by the CPU $20x1$ and supplying the same with information.

The CPUs $20x1$ may be configured, for example by software residing in the memories $20x2$, to process various data inputs and to control the functions of the memory $20x2$, the transmitter $20x3$ and the receiver $20x4$ (as well as the evaluator 20236, the performer 20237 and the notifier 202323 (of the apparatus 2023) and the forwarder 202524 (of the source SGW 2025)). The memory $20x2$ may serve for storing code means for carrying out the methods according to the aspects disclosed herein, when run on the CPU $20x1$.

It is to be noted that the transmitter $20x3$ and the receiver $20x4$ may alternatively be provided as an integral transceiver, as is shown in FIG. 9A. It is further to be noted that the transmitters/receivers may be implemented in the forms described in the first embodiment. At least one of the above-described evaluator 20236, performer 20237 and notifier 202323 (of the apparatus 2023) and forwarder 202524 (of the source SGW 2025) as well as the apparatus 2023 or source SGW 2025 itself, or the respective functionalities carried out, may also be implemented as a chipset, module or subassembly.

TENTH EXAMPLE

For the purpose of the tenth example, note that the functionalities are shown in FIGS. 8E and 8F.

For the case of an enterprise network with local IP access feature, the following trigger conditions can be applied for the use of the new Serving GW relocation procedure.

When the activator 20119 of the UE 201 (see FIG. 8E) successfully activates a local connection and the SGW is not in the enterprise local GW (the apparatus 2023 may detect this via detector 20238), the trigger 202320 of the MME/SGSN 2023 triggers the relocation of the SGW into the local GW in the enterprise network.

When the deactivator 20121 of the UE 201 (see FIG. 8E) deactivates (all of the) local connections (the apparatus 2023 may detect this via detector 20238), the SGW role can be relocated from the local GW to the operator's GW. This condition is optional, and improves signalling load if mobility into/out of the enterprise network is more frequent than the setup/release of a local connection; or this can be used to decrease the load on the local GW.

Additionally, when moving into the enterprise network, regular SGW relocation to the local GW needs to be performed (by performer 20237) in case the UE 201 has a local connection (i.e., an originally remote connection to the local GW becomes local). When moving out of the enterprise network and the SGW was local, regular SGW relocation is performed (by performer 20237) to the operator SGW.

The conditions above require that the MME/SGSN 2023 actually knows when the UE 201 enters or leaves the enterprise network. That is fulfilled in connected mode, and also in idle mode if the enterprise network uses a separate RA/TA that is unique to the enterprise. Additionally in LTE, it is necessary not to use the TA list feature between the enterprise TA and the surrounding TA.

If these conditions are not met in idle mode due to operator network configuration with the aim of reducing the TA/RA signalling, the MME/SGSN 2023 may not become aware when the UE 201 enters or leaves the enterprise network. In that case, the following solution can be used:

Each time the UE 201 becomes idle and the SGW 2025 is in the local enterprise GW, the SGW 2025 is relocated to the operator SGW 2026.

Each time the UE becomes connected within the enterprise network and has a local connection, the SGW 2025 is relocated into the local GW 2026. Note that this implies that for a short duration packets on the local connection may pass via the operator SGW; but this is not expected to cause any significant performance degradation.

With the above conditions it is possible to avoid the TAU/RAU signalling (based on operator configuration) when the UE 201 enters or leaves the enterprise network. While this reduces TAU/RAU signalling for the UE 201, it increases the amount of SGW relocation signalling in the network.

The following optimization is for the case described in the previous section when TAU/RAU in idle mode cannot be guaranteed at the enterprise network border. This optimization reduces the number of SGW relocations.

In this embodiment, the SGW 2025 is not relocated to the operator network when the UE 201 becomes idle in the enterprise network. Instead, the following conditions apply:

Each time the UE 201 becomes connected within the enterprise network and has a local connection but the SGW 2025 is in the operator network, the SGW 2025 is relocated into the local GW 2026.

Again, this implies that for a short duration packets on the local connection may pass via the operator SGW; but this is not expected to cause any significant performance degradation.

Each time the UE 201 becomes connected outside the enterprise network but the SGW 2025 is in the enterprise local GW, the SGW 2025 is relocated into the operator SGW 2026.

Note that this implies that for a short duration packets on the operator connection may pass via the local enterprise SGW.

This may be acceptable as long as the operator network and the enterprise network are joined by a sufficiently high bandwidth and low delay connection, so that the short routing detour via the enterprise SGW does not significantly affect the performance of the operator connection.

This variant may require a further mechanism: the local SGW must be able to accept S1-U uplink packets on both its local enterprise IP address, and its operator-assigned IP address associated with its IP secure (IPsec) tunnel. The MME/SGSN 2023 may have to be able to use the local enterprise IP address in case the UE 201 is in the enterprise network, or the operator assigned IP address in case the UE 201 is outside the enterprise network. The local enterprise IP address is known to the MME 2023 as explicitly announced by the SGW 2025 on S11/S4 and the operator assigned IP address may be known to the MME/SGSN 2023 as either being identical to the PGW is user plane address in case it is collocated with a PGW; or be identical to the control plane SGW address which is the endpoint of the S11/S4 signalling.

As an alternative, it is possible to extend S11/S4 to let the SGW explicitly inform the MME/SGSN 2023 about the two IP addresses, and possibly also about the two separate TEIDs. Note also that this approach additionally requires that the operator routing and firewall rules are such that the enterprise SGW is reachable by (e)NodeBs 2021 outside the enterprise network which might not always be the case. Also, this requires that a macro RAN is upgraded to support the S1/Iu message defined for this procedure.

The above approach might be applicable in cases when the SGW 2025 (and possibly also the PGW) is managed by the operator and is actually located in the operator network. That is, the operator uses a SGW 2025 close to the enterprise network, but still within the operator network. The PGW may also be in the operator network, and VPN tunneling can be used to forward traffic to/from the enterprise network. In that case, there is no need to deal with two SGW addresses, as only the operator address is used and there is no separate local address.

ELEVENTH EXAMPLE

Figure 9C:
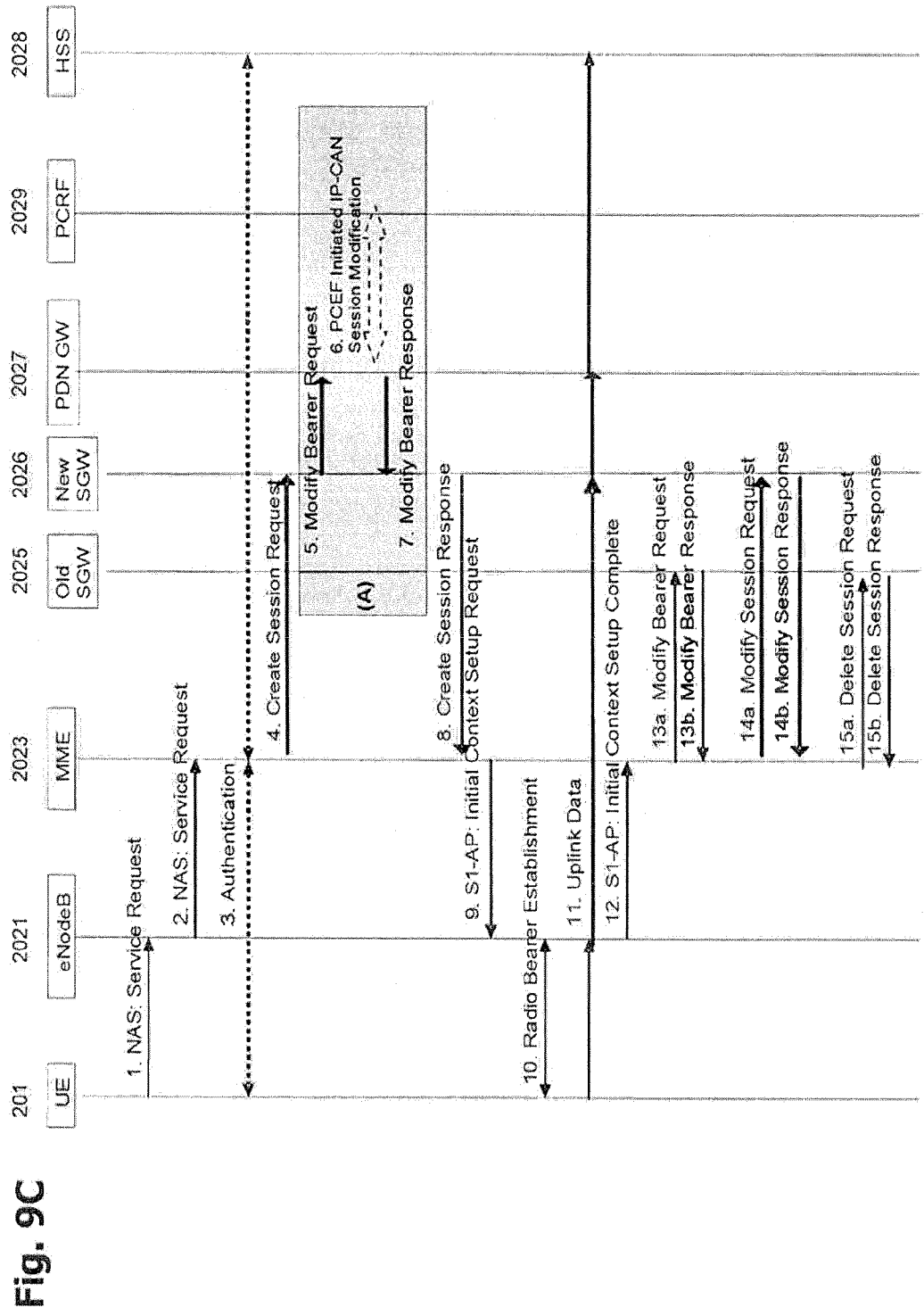
FIG. 9C shows a method of the fourth embodiment according to the present invention.

Yet another extension is to allow the SGW relocation procedure to take place during Service Request, which would further improve the flexibility of SGW relocations (see FIG. 9C):

Steps 1 to 3:
Service Request message is sent from UE 201 to MME 2023 (and is received by the receiver 20233), and optional Authentication may take place.

Step 4:
The MME 2023 decides to relocate SGW 2025 based on the UE 201 current location and other information. The new SGW 2026 establishes context.

Step 5:
New SGW 2026 notifies PGW 2027 about its new IP address and TEID.

Step 6:
PCRF 2029 interaction may take place.

Step 7:
PGW 2027 responds to SGW 2026 to acknowledge the relocation.

Step 8:
New SGW 2026 acknowledges to MME 2023 and informs it about the new TEIDs.

Steps 9-12:
Context is established in the eNB 2021 using the S1-U termination of the new SGW 2026.

Step 13:
The old SGW 2025 is notified about the address and TEID of the current eNB 2021, so that it can forward (by the forwarder 202524 of the source SGW 2025) any buffered downlink data towards the eNB 2021. This is important for network initiated Service Request (i.e., paging). If the Service request is not network initiated, i.e. the MME has not received any Downlink Data notification from the old SGW 2025, this step can be skipped.

Step 14:
The new SGW 2026 is notified about the address and TEID of the current eNB 2021. This step can be performed in parallel to step 13.

Step 15:
The context in the old SGW 2025 is released.

A similar procedure can be applied for 3G. Note that the SGW relocation during the Service Request procedure may make the relocation longer. This is especially true for the roaming case as the signalling would involve a round-trip towards the Home PLMN (HPLMN). Hence it may be possible to limit the usage of this type of SGW relocation to non-roaming users.

With the possibility of SGW relocation during Service Request, it becomes easier to allow deployments without TA/RA at the enterprise coverage border. The following conditions can be applied.

Each time a Service Request is performed outside the enterprise network and the SGW is in the enterprise network, it is relocated to the operator's SGW.

Each time a Service Request is performed inside the enterprise network and the UE has a local connection, the SGW is relocated to the local SGW in the operator network.

Note that the above conditions are of course to be applied with those in the third embodiment with respect to connected mode mobility and activation/release of the local PDN connection.

The present invention may require updates to the MME/SGSN 2023 to support the new procedures and the associated trigger conditions. In addition, the standalone SGW relocation procedure requires upgrading the RAN nodes to support the new message.

For enterprise local IP access, initially it is sufficient if the H(e)NodeBs forming an enterprise network (as well as the MME/SGSN 2023) are upgraded to support the new procedure. This allows running the new procedure within the enterprise network which is sufficient, except for the optimization in the third embodiment above which is not essential. In later phases, (e)NodeBs in the macro RAN may also be upgraded which expands the applicability of the new procedure.

For transport optimizations, in case the RAN does not support the necessary message in connected mode, it is possible to wait with the optimization until the terminal becomes idle.

The proposed solution enables relocation of SGW 2025, triggered by any event considered by the serving MME for other reasons than that the UE 201 has left the service area of its current SGW. This yields the following advantages:

The user plane path is optimized for moving subscribers or change in the traffic conditions or PDN connectivity.

The benefits of a combined SGW/PGW node are exploited.

A certain SGW (e.g., for maintenance or load rebalancing) or the mobile network below the IP point of presence (also referred to as selected IP traffic offload or SIPTO) is alleviated of load.

Allocated UEs are moved from a SGW planned/scheduled to be taken down for O&M, service, or upgrade.

For enterprise local IP access, with the help of the new standalone SGW relocation procedure, it is possible to limit the number of SGW relocation events, and limit them to the cases when it is actually necessary. This decreases the signalling load, and also the load on a given (local) SGW. This may also reduce the configuration complexity on MME/SGSN because it avoids the need to configure a priori which users may need SGW relocation later on.

As a result of the more efficient handling of SGW relocations, it becomes possible to avoid alternative complex solutions for the enterprise local IP access case with standalone GW. In this way the solution helps reducing system complexity and avoids divergent architecture development paths that risk market fragmentation and interoperability issues.

In addition, the present invention in view of TA/RA optimization, including the possibility of SGW relocation during Service Request further reduce the signalling impact in scenarios including enterprise networks.

The extension of Service request procedure with SGW relocation would make the relationship of TA lists and SGW service areas less coupled. To date, a TA list must be fully included in the SGW's current service area; that restriction could be lifted as we could perform SGW relocation when the UE becomes connected (although that causes some extra delay).

It is believed that the advantages of the technique presented herein will be fully understood from the foregoing description, and it will be apparent that various changes may be made in the form, constructions and arrangement of the exemplary aspects thereof without departing from the scope of the invention or without sacrificing all of its advantageous effects. Because the technique presented herein can be varied in many ways, it will be recognized that the invention should be limited only by the scope of the claims that follow.

The invention claimed is:

1. A method for relocating a Serving Gateway, SGW, with which a user equipment, UE, is associated in a UE-connected mode, the method being performed in a Mobility Management Entity, MME, and comprising the steps of:
   a) triggering, from the MME, a relocation of a source SGW to a target SGW by sending a Create Session Request message to the target SGW;

b) receiving, from the target SGW, a Create Session Response message including General Packet Radio Service, GPRS, Tunnelling Protocol, GTP, endpoints of the target SGW;

c) updating, from the MME to an Evolved NodeB, eNB, an Internet Protocol, IP, address and a Tunnel Endpoint IDentifier, TEID, of the target SGW while the UE remains in the UE-connected mode; and d) sending, from the MME to the source SGW, a Delete Session Request to delete a session.

2. The method according to claim 1, wherein steps a) to d) are performed while the UE is connected to the eNB remaining unchanged.

3. The method according to claim 1, wherein the UE is Evolved Packet System, EPS, Mobility Management, EMM-registered with the MME.

4. The method according to claim 1, wherein step a) is performed responsive to a request for activation of a new PDN connection, the method further comprising:

e) performing, at the MME, the SGW relocation procedure of steps b) to d) for the existing PDN connections; and f) continuing, at the MME, the activation of the new PDN connection using the target SGW.

5. The method according to claim 1, wherein the method is performed in a third generation, 3G, network with direct tunnelling, wherein:

a Serving General Packet Radio Service, GPRS, Support Node, SGSN, assumes the role of the MME, a Radio Network Controller, RNC, assumes the role of the eNB, and step c) is performed using one or more signalling messages.

6. A method for relocating a Serving Gateway, SGW, with which a selected user equipment, UE, is associated, the method being performed in a Mobility Management Entity, MME, and comprising the steps of:

a1) setting, in the MME, a flag for the UE selected for SGW relocation, in preparation for the next time the UE performs a mobility procedure;

or a2) detecting, in the MME, when the selected UE transits to an idle mode;

or a3) requesting, from the MME, an Evolved NodeB, eNB, to initiate a path switch;

b) triggering, from the MME responsive to step a1), a2) or a3), a relocation of a source SGW to a target SGW by sending a Create Session Request message to the target SGW;

c) receiving, from the target SGW, a Create Session Response message including General Packet Radio Service, GPRS, Tunnelling Protocol, GTP, endpoints of the target SGW; and d) sending, from the MME to the source SGW, a Delete Session Request to delete a session.

7. A method for relocating a Serving Gateway, SGW, with which a selected user equipment, UE, is associated in a UE-connected mode, the method being performed in a Mobility Management Entity, MME, and comprising the steps of:

a) getting information so as to trigger an evaluation procedure for SGW relocation;

b) evaluating whether the SGW relocation would be beneficial for the UE; and c) performing, if the relocation improves a traffic for the UE, the SGW relocation for the UE by:

sending a Create Session Request message to a target SGW;

receiving, from the target SGW, a Create Session Response message including General Packet Radio Service, GPRS, Tunnelling Protocol, GTP, endpoints of the target SGW while the UE remains in the UE-connected mode; and sending, from the MME to a source SGW, a Delete Session Request to delete a session.

8. The method according to claim 7, wherein step c) may be performed if the UE is in the idle mode.

9. The method according to claim 7, wherein step a) comprises:

receiving, at the MME, a notification that the UE performs one of opening a new Packet Data Network, PDN, connection and closing an existing PDN connection.

10. The method according to claim 7, wherein step b) further comprises:

selecting the target SGW for a given bearer.

11. The method according to claim 10, wherein the selection step is performed based on at least one of the following:

information on capability, configuration, and traffic-offload information of all gateways, GWs;

topology information;

GW load information; and information on active Access Point Names, APNs, and bearers.

12. The method according to claim 11, wherein the information on capability, configuration, and traffic-offload information includes an ability of the GW to act as a combined SGW/Packet Data Network, PDN, gateway, PGW.

13. The method according to claim 7, comprising a functionality for relocation in an enterprise network involving local Internet Protocol, IP, access.

14. The method according to claim 13, wherein the triggering of evaluation and relocation steps b) and c) comprises:

detecting a successful activation of a local connection by the UE; and triggering, if the source SGW is not in an enterprise local gateway, GW, the relocation of the source SGW to the local GW as target SGW.

15. The method according to claim 7, wherein at least the relocation step c) is performed during a service request.

16. The method according to claim 15, further comprising, if the service request was network initiated:

notifying, from the MME, the source SGW about an address of a current Evolved NodeB, eNB, address of the UE and a Tunnel Endpoint IDentifier, TEID so as to enable the source SGW to forward to the eNB any buffered downlink data.

17. A non-transitory computer program product comprising program code portions for performing the method of claim 1 when the computer program product is executed on one or more computing devices.

18. An apparatus for relocating a Serving Gateway, SGW, with which a user equipment, UE, is associated in a UE-connected mode, the apparatus comprising:

a component configured to trigger a relocation of a source SGW to a target SGW by sending a Create Session Request message to the target SGW;

a component configured to receive, from the target SGW, a Create Session Response message including General Packet Radio Service, GPRS, Tunnelling Protocol, GTP, endpoints of the target SGW;

a component configured to update, from the apparatus to an Evolved NodeB, eNB, an Internet Protocol, IP, address and a Tunnel Endpoint IDentifier, TEID, of the target SGW while the UE remains in the UE-connected mode; and a component configured to send, from the apparatus to the source SGW, a Delete Session Request to delete a session.

19. An apparatus for relocating a Serving Gateway, SGW, with which a selected user equipment, UE, is associated, the apparatus comprising:
  a component configured to set, in the apparatus, a flag for the UE selected for SGW relocation, in preparation for the next time the UE performs a mobility procedure;
  or
  a component configured to wait, in the apparatus, until the selected UE transits to an idle mode;
  or
  a component configured to request, from the MME, an Evolved NodeB, eNB, to initiate a path switch;
  a component configured to trigger, from the apparatus responsive to the setting, waiting or requesting component, a relocation of a source SGW to a target SGW by sending a Create Session Request message to the target SGW;
  a component configured to receive, from the target SGW, a Create Session Response message including General Packet Radio Service, GPRS, Tunnelling Protocol, GTP, endpoints of the target SGW; and
  a component configured to send, from the apparatus to the source SGW, a Delete Session Request to delete a session.

20. A non-transitory computer program product comprising program code portions for performing the method of claim 6 when the computer program product is executed on one or more computing devices.

21. A non-transitory computer program product comprising program code portions for performing the method of claim 7 when the computer program product is executed on one or more computing devices.

* * * * *

UNITED STATES PATENT AND TRADEMARK OFFICE
CERTIFICATE OF CORRECTION

PATENT NO. : 8,578,035 B2  
APPLICATION NO. : 13/258363  
DATED : November 5, 2013  
INVENTOR(S) : Miklos et al.

Page 1 of 1

It is certified that error appears in the above-identified patent and that said Letters Patent is hereby corrected as shown below:

In the Specification

In Column 22, Line 39, delete "PGW is user" and insert -- PGW user --, therefor.

Signed and Sealed this  
Eighth Day of July, 2014

Michelle K. Lee  
*Deputy Director of the United States Patent and Trademark Office*